US012761854B2

(12) United States Patent
Hsiao et al.

(10) Patent No.: US 12,761,854 B2
(45) Date of Patent: Oct. 13, 2026

(54) DISPLAY APPARATUS

(71) Applicant: AUO Corporation, Hsinchu City (TW)

(72) Inventors: Yang-Ting Hsiao, Hsinchu City (TW); Sheng-Wen Cheng, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 19/322,693

(22) Filed: Sep. 9, 2025

(65) Prior Publication Data

US 2026/0003560 A1 Jan. 1, 2026

Related U.S. Application Data

(62) Division of application No. 18/476,250, filed on Sep. 27, 2023, now Pat. No. 12,436,726.

(30) Foreign Application Priority Data

May 26, 2023 (TW) ................................ 112119674

(51) Int. Cl.

| | |
|---|---|
| ***G06F 3/14*** | (2006.01) |
| ***G02B 26/08*** | (2006.01) |
| ***G02B 27/14*** | (2006.01) |
| ***G02B 27/28*** | (2006.01) |
| ***G06F 3/01*** | (2006.01) |

(52) U.S. Cl.

CPC ....... *G06F 3/1431* (2013.01); *G02B 26/0816* (2013.01); *G02B 27/141* (2013.01); *G02B 27/283* (2013.01); *G06F 3/013* (2013.01)

(58) Field of Classification Search

CPC ..... G06F 3/1431; G06F 3/013; G02B 26/816; G02B 27/141; G02B 27/283

See application file for complete search history.

(56) References Cited

U.S. PATENT DOCUMENTS

| | | | | |
|---|---|---|---|---|
| 2012/0069304 A1* | 3/2012 | Kanazawa | H04N 9/3147 353/20 |
| 2021/0294100 A1* | 9/2021 | Lin | G02B 5/3083 |
| 2024/0369861 A1* | 11/2024 | Le | G02F 1/0136 |
| 2024/0393596 A1* | 11/2024 | Zou | G02B 27/286 |
| 2025/0083525 A1* | 3/2025 | Momiyama | B60K 35/81 |

FOREIGN PATENT DOCUMENTS

| | | | |
|---|---|---|---|
| WO | WO-202111273 A1 * | 6/2021 | G02B 5/305 |

* cited by examiner

*Primary Examiner* — Lixi C Simpson
(74) *Attorney, Agent, or Firm* — JCIPRNET

(57) ABSTRACT

A display apparatus is adapted to display on at least one of a first display surface and a second display surface, and includes a display panel, an optical path selection module, and at least one reflective element. The display panel is provided with the first display surface, and is adapted to emit an image beam. The optical path selection module is disposed on a transmission path of the image beam. The image beam transmitted along a first optical path after passing through the optical path selection module is adapted to display a first image on the first display surface. The image beam transmitted along a second optical path after passing through the optical path selection module is adapted to display a second image on the second display surface. The first image is different from the second image. The at least one reflective element is disposed on the second optical path.

7 Claims, 20 Drawing Sheets

DISPLAY APPARATUS

CROSS-REFERENCE TO RELATED APPLICATION

This application is a divisional application of and claims the priority benefits of U.S. application Ser. No. 18/476,250, filed on Sep. 27, 2023, which claims the priority benefit of Taiwan application serial no. 112119674, filed on May 26, 2023. The entirety of each of the above-mentioned patent applications is hereby incorporated by reference herein and made a part of this specification.

BACKGROUND

Technical Field

The disclosure relates to a display technology, and in particular to a display apparatus.

Description of Related Art

In recent years, many car manufacturers have successively launched smart cockpits, focusing on personalized, digital, and immersion-optimized driving experience. Since the functions of the smart cockpit cover in-vehicle information, communication, entertainment, driving monitoring, human-machine interface, etc., it needs to be composed of multiple displays. For example, a display used as a digital dashboard may be used to display the in-vehicle information, and a display used as a display source of a head-up display (HUD) may be used to display monitoring information while driving. However, the driver's field-of-view is limited, and too many displays may lead to issues such as a decrease in the actual utilization of these displays and an increase in the energy consumption.

SUMMARY

The disclosure provides a display apparatus having multiple display surfaces and a low energy consumption.

The display apparatus of the disclosure is adapted to display on at least one of a first display surface and a second display surface. The display apparatus includes a display panel, an optical path selection module and at least one reflective element. The display panel is provided with the first display surface and is adapted to emit an image beam. The optical path selection module is disposed on a transmission path of the image beam from the display panel. The image beam transmitted along a first optical path after passing through the optical path selection module is adapted to present a first image on the first display surface. The image beam transmitted along a second optical path after passing through the optical path selection module is adapted to present a second image on the second display surface. The first image is different from the second image. At least one reflective element is disposed on the second optical path.

Based on the above, in the display apparatus according to an embodiment of the disclosure, the optical path selection module is adapted to switch the image beam from the display panel between different optical paths and present the image of the display panel on different display surfaces according to different usage requirements. In this way, multiple display surfaces may share the same display panel for display, which helps to greatly reduce the energy consumption in operation of the display apparatus.

DESCRIPTION OF THE EMBODIMENTS

Figure 1A:
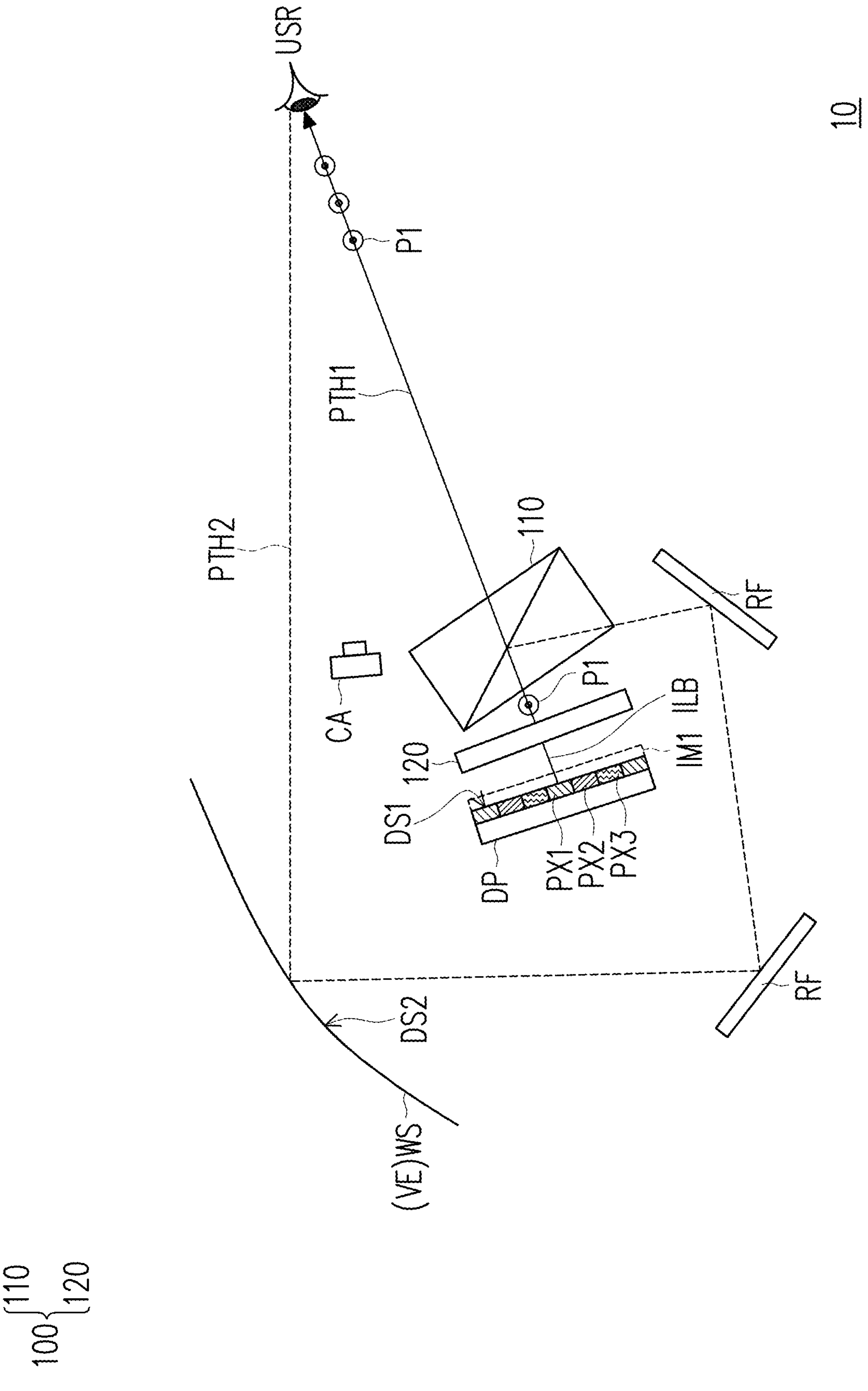
FIGS. 1A to 1C are schematic views of a display apparatus operating in different modes according to the first embodiment of the disclosure.

The usages of "approximately", "close to", or "substantially" throughout the specification include the indicated value and an average value within an acceptable deviation range of the specific value confirmed by those skilled in the art, considering the measurement in question and a specific number of errors related to the measurement (that is, the limitation of measurement system). For example, "approximately" may mean to be within one or more standard deviations of the value, or within ±30%, ±20%, ±10%, or ±5%. Furthermore, the usages of "approximately", "close to" or "substantially" throughout the specification allow selection of a more acceptable deviation scope or standard deviation depending on optical properties, etching properties, or other properties, and it is not necessary to use one standard deviation for all properties.

In the accompanying drawings, thicknesses of layers, films, panels, regions and so on are exaggerated for clarity. It should be understood that when an element such as a layer, a film, an area, or a substrate is described as being "on" another element or "connected to" another element, the element may be directly on another element or connected to another element, or there may be other elements interposed therebetween. In contrast, when an element is described as being "directly on another element" or "directly connected to" another element, there is no other element therebetween. Herein, "connect" used in the specification may refer to physical and/or electrical connection. Furthermore, "electrically connect" or "coupled to" may mean that there are other elements interposed between two elements.

Moreover, relative terms such as "below" or "bottom" and "above" or "top" may serve to describe the relation between one element and another element in the text according to the illustration of the drawings. It should also be understood that the relative terms are intended to include different orientations of a device in addition to the orientation shown in the drawings. For example, if a device in the accompanying drawings is flipped, an element described as being on the "lower" side of other elements shall be re-orientated to be on the "upper" side of other elements. Thus, the exemplary term "lower" may cover the orientations of "upper" and "lower," depending on the specific orientations of the accompanying drawings. Similarly, if a device in the accompanying drawings is flipped, an element described as being "below" other elements shall be re-orientated to be "above" other elements.

Thus, the exemplary term "above" or "below" may cover the orientations of above and below.

Exemplary embodiments are described with cross-sectional views of schematic illustrations of ideal embodiments. Thus, shape alterations as a result of, for example, manufacturing techniques and/or tolerances may be expected, and the illustrated regions of the embodiments described herein should not be construed to particular shapes but include shape deviations due to, for example, manufacturing. For example, regions shown or described as being flat may generally have rough and/or non-linear features. Furthermore, the acute angles shown may be round. Therefore, the regions illustrated in the drawings are only schematic representations and are not intended to illustrate the exact shapes of the regions or to limit the scope of the claims.

Reference will now be made in detail to the exemplary embodiments. Examples of exemplary embodiments are described in the accompanying drawings. Wherever possible, the same reference symbols are used to denote the same or similar parts in the drawings and the description.

Figure 1B:
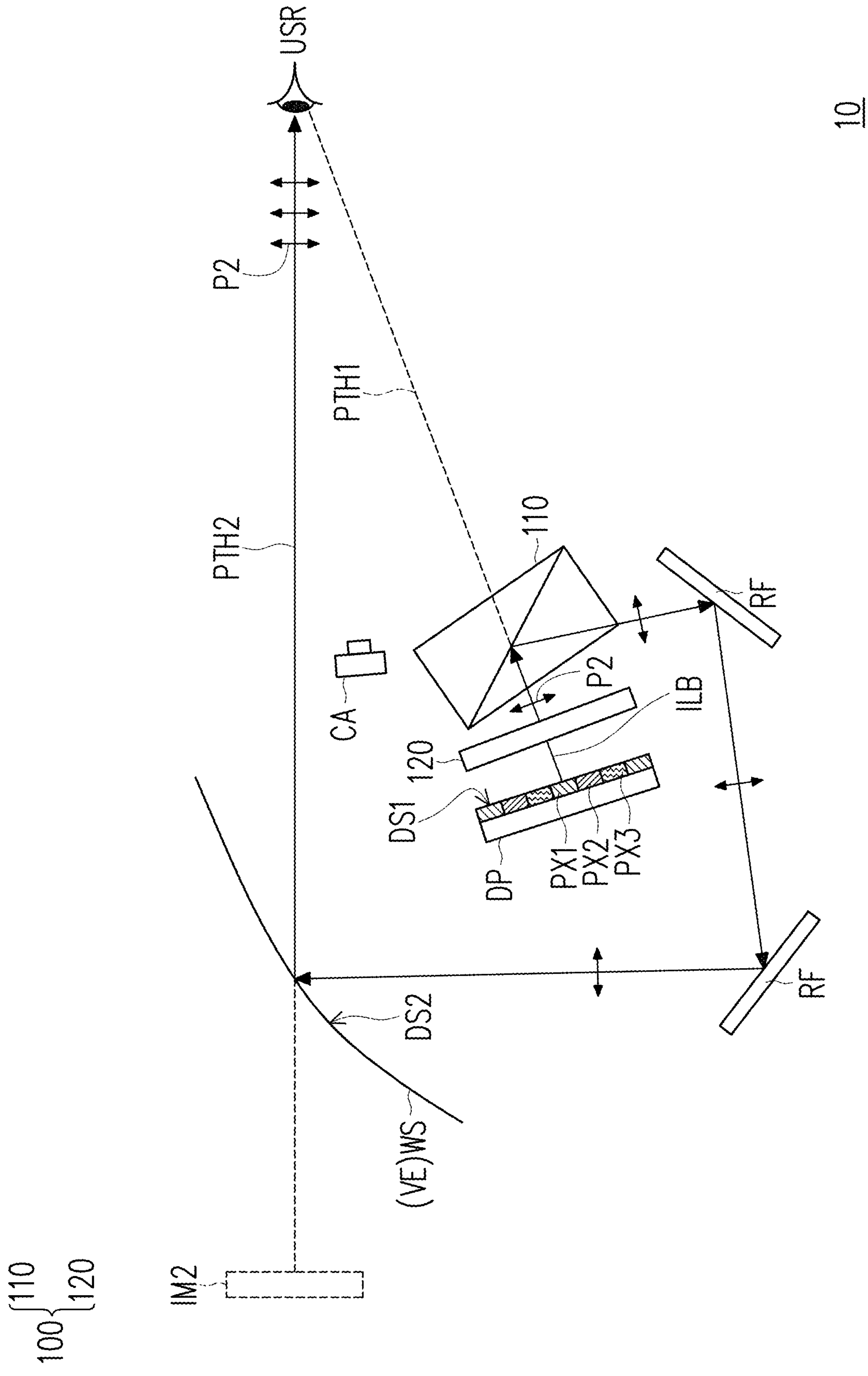
Figure 1C:
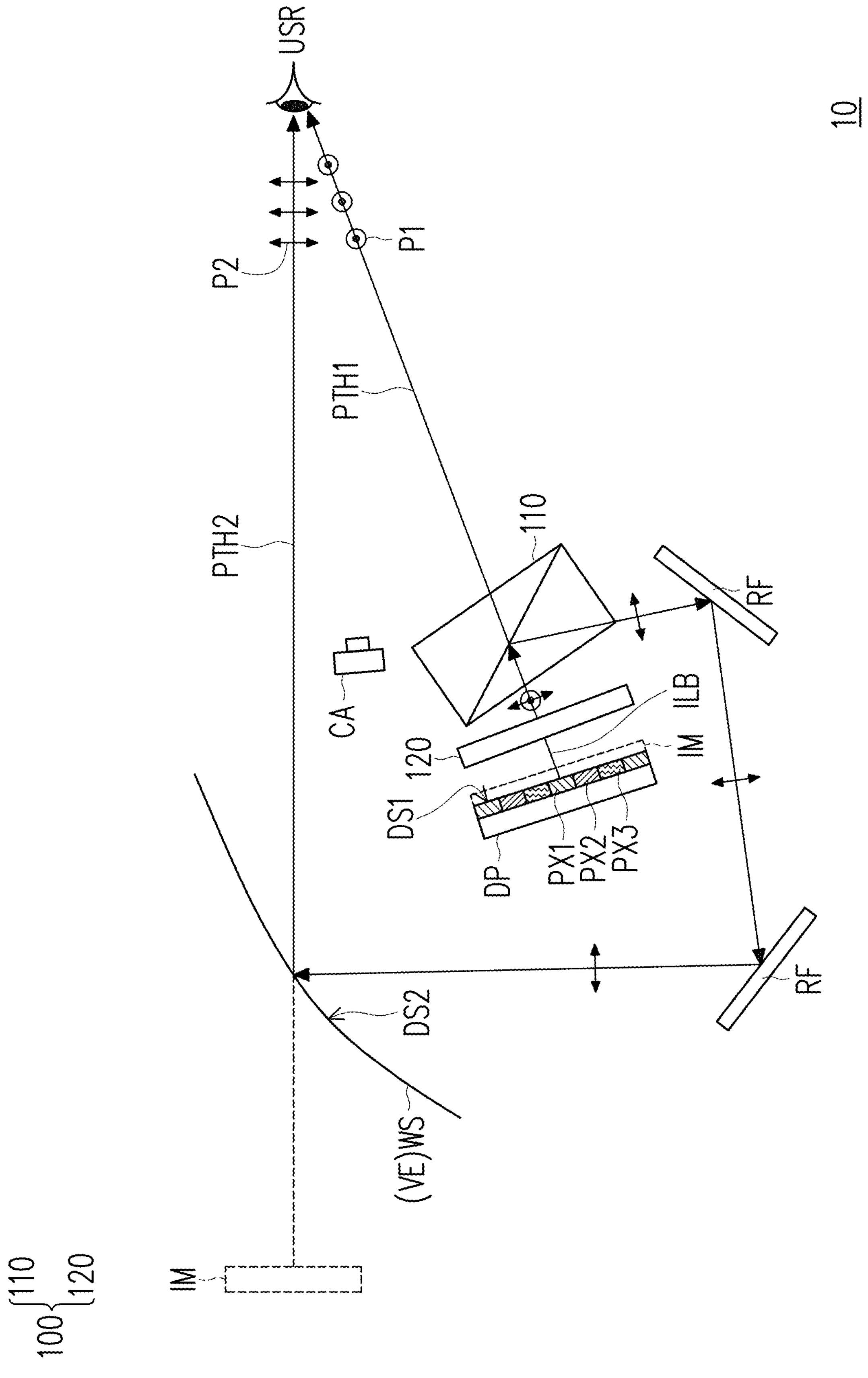

FIGS. 1A to 1C are schematic views of a display apparatus operating in different modes according to the first embodiment of the disclosure. Referring to FIG. 1A and FIG. 1B, a display apparatus 10 is adapted to display on at least one of a first display surface DS1 and a second display surface DS2. The display apparatus 10 includes a display panel DP, an optical path selection module 100 and a reflective element RF. The display panel DP is adapted to emit an image beam ILB. The optical path selection module 100 is disposed on a transmission path of the image beam ILB from the display panel DP.

In this embodiment, the display panel DP may include multiple pixels of different display colors, for example: a first pixel PX1 for displaying a red color, a second pixel PX2 for displaying a green color, and a third pixel PX3 for displaying a blue color, but not limited thereto. The image beam ILB emitted by the display panel DP may be a red light from the first pixel PX1, a green light from the second pixel PX2, a blue light from the third pixel PX3, or a combination thereof.

The image beam ILB from the display panel DP may be transmitted on a first optical path PTH1 or the second optical path PTH2 through the selection of the optical path selection module 100. For example, the image beam ILB transmitted along the first optical path PTH1 after passing through the optical path selection module 100 is adapted to present a first image IM1 on the first display surface DS1. The image beam ILB transmitted along the second optical path PTH2 after passing through the optical path selection module 100 is adapted to present a second image IM2 on the second display surface DS2. The first image IM1 is different from the second image IM2.

In the embodiment, the display apparatus 10 is adapted to be installed in a vehicle VE for in-vehicle information and dynamic information while driving. For example, the first display surface DS1 may be disposed on the display panel DP, and the second display surface DS2 may be disposed on a windshield WS of the vehicle VE. The display panel DP may be used as a vehicle dashboard for displaying the in-vehicle information on the first display surface DS1, and a head-up display for displaying the dynamic information while driving on the second display surface DS2, but is not limited thereto.

For example, in order to present the second image IM2 of the display panel DP on the windshield WS, the display apparatus 10 may be provided with two reflective elements RF on the transmission path of the second optical path PTH2, but is not limited thereto. In this embodiment, the reflective element RF is, for example, a plane mirror with a high reflectivity in a visible light band. However, the disclosure is not limited thereto. In other embodiments, the reflective element may also be a curved mirror with an image scaling effect.

In detail, the optical path selection module 100 may include a polarizing beam splitting element 110 and an electrically controlled polarization modulator 120. The electrically controlled polarization modulator 120 is disposed between the polarizing beam splitting element 110 and the display panel DP, and is adapted to switch a polarization state of the image beam ILB from the display panel DP between a first polarization state P1 and a second polarization state P2. In this embodiment, the first polarization state P1 and the second polarization state P2 may be two linear polarization states perpendicular to each other. The polarizing beam splitting element 110 is, for example, a polarizing beam splitter (PBS). The electrically controlled polarization modulator 120 includes, for example, an electrically controllable wave plate (such as a liquid crystal phase retarder) or an electro-optic modulator, but is not limited thereto.

In this embodiment, the display panel DP is, for example, a liquid crystal display panel, so the image beam ILB from the display panel DP already has the polarization state. However, when the display panel is a self-luminous display panel (such as an organic light emitting diode display panel, a micro light emitting diode display panel, or a mini light emitting diode display panel), there may be a polarizer between the display panel and the electrically controlled polarization modulator 120 to enable the image beam emitted by the display panel to generate the polarization state.

For example, when the image beam ILB has the first polarization state P1 after passing through the electrically controlled polarization modulator 120, the image beam ILB is adapted to penetrate the polarizing beam splitting element 110 and be transmitted along the first optical path PTH1 (as shown in FIG. 1A). At this time, a user USR (such as a vehicle driver) may view the first image IM1 (such as vehicle speed, fuel level, engine speed, engine temperature, etc.) presented by the display panel DP through the first display surface DS1. That is, the display apparatus 10 is now operating in a dashboard mode.

In contrast, when the image beam ILB has the second polarization state P2 after passing through the electrically controlled polarization modulator 120, the image beam ILB is adapted to be reflected by the polarizing beam splitting element 110 and transmitted along the second optical path PTH2 (as shown in FIG. 1B). At this time, the user USR may view the second image IM2 (such as navigation information or the dynamic information while driving) presented by the display panel DP through the second display surface DS2 on the windshield WS. That is, the display apparatus 10 is now operating in a head-up display mode.

Please refer to FIG. 1C. When the image beam ILB has both a polarization component of the first polarization state P1 and a polarization component of the second polarization state P2 (i.e. a third polarization state) after passing through the electrically controlled polarization modulator 120, a part of the image beam ILB having the first polarization state P1 may penetrate the polarizing beam splitting element 110 and be transmitted along the first optical path PTH1, while another part of the image beam ILB having the second polarization state P2 may be reflected by the polarizing beam splitting element 110 and transmitted along the second optical path PTH2. At this time, the user USR may view an image IM (such as the mixed information of the in-vehicle information and the dynamic information while driving) presented by the display panel DP through the first display surface DS1 and the second display surface DS2 at the same time. That is, the display apparatus 10 is now operating in a hybrid mode.

Through the polarization state switching of the electrically controlled polarization modulator 120, the optical path selection module 100 may switch the image beam ILB from the display panel DP between different optical paths, and present the image of the display panel DP on the desired display surface according to a movement of the user USR. In this way, disposing too many display panels for displaying different image information and resulting in a decrease in an actual utilization rate of these display panels and an increase in an energy consumption may be prevented. In other words, the display apparatus 10 of this embodiment utilizes the single display panel DP to switch or display simultaneously between multiple display surfaces, which may not only meet various display requirements, but also effectively reduce the energy consumption in operation.

Please refer to FIG. 1A and FIG. 1B. The display apparatus 10 may also optionally include an eye-tracking module, which is adapted to trigger the optical path selection module 100 to perform the switching between the first optical path PTH1 and the second optical path PTH2 according to a gaze direction of the user USR. The eye-tracking module may include a photographing element CA for capturing an eyeball image of the user USR, such as a CCD (Charge Coupled Device) image sensor or a CMOS (Complementary Metal-Oxide Semiconductor) image sensor, but is not limited thereto.

For example, when the display apparatus 10 immediately captures through the eye-tracking module (or the photographing element CA) that the gaze direction of the user USR is pointing to the display panel DP (as shown in FIG. 1A), a control system (not shown) of the display apparatus 10 then adjusts the electrically controlled polarization modulator 120 to enable the image beam ILB passing through to have the first polarization state P1, be transmitted along the first optical path PTH1, and display the first image IM1 on the first display surface DS1. When the eye-tracking module immediately captures that the gaze direction of the user USR is pointing to the windshield WS (as shown in FIG. 1B), the control system then adjusts the electrically controlled polarization modulator 120 to enable the image beam ILB passing through to have the second polarization state P2, be transmitted along the second optical path PTH2, and display the second image IM2 on the second display surface DS2.

That is to say, an application of the eye-tracking module may enable the display apparatus 10 to present the image information that the user USR currently wants to view on the corresponding display surface in real time, while the display surface that is not in the gaze direction does not have any image presented. Accordingly, the utilization rate of light energy of the image beam ILB may be effectively improved.

In particular, when the user USR sets the display apparatus 10 to the above-mentioned hybrid mode (as shown in FIG. 1C), the image IM is presented on the first display surface DS1 and the second display surface DS2 at the same time. Therefore, the eye-tracking module may be disabled to reduce the overall energy consumption of the display apparatus 10.

In the following, other embodiments are provided to explain the disclosure in detail. The same members are labeled with the same reference numerals, and description of the same technical content is omitted. For the omitted parts, please refer to the above embodiments, which are not repeated herein.

Figure 2A:
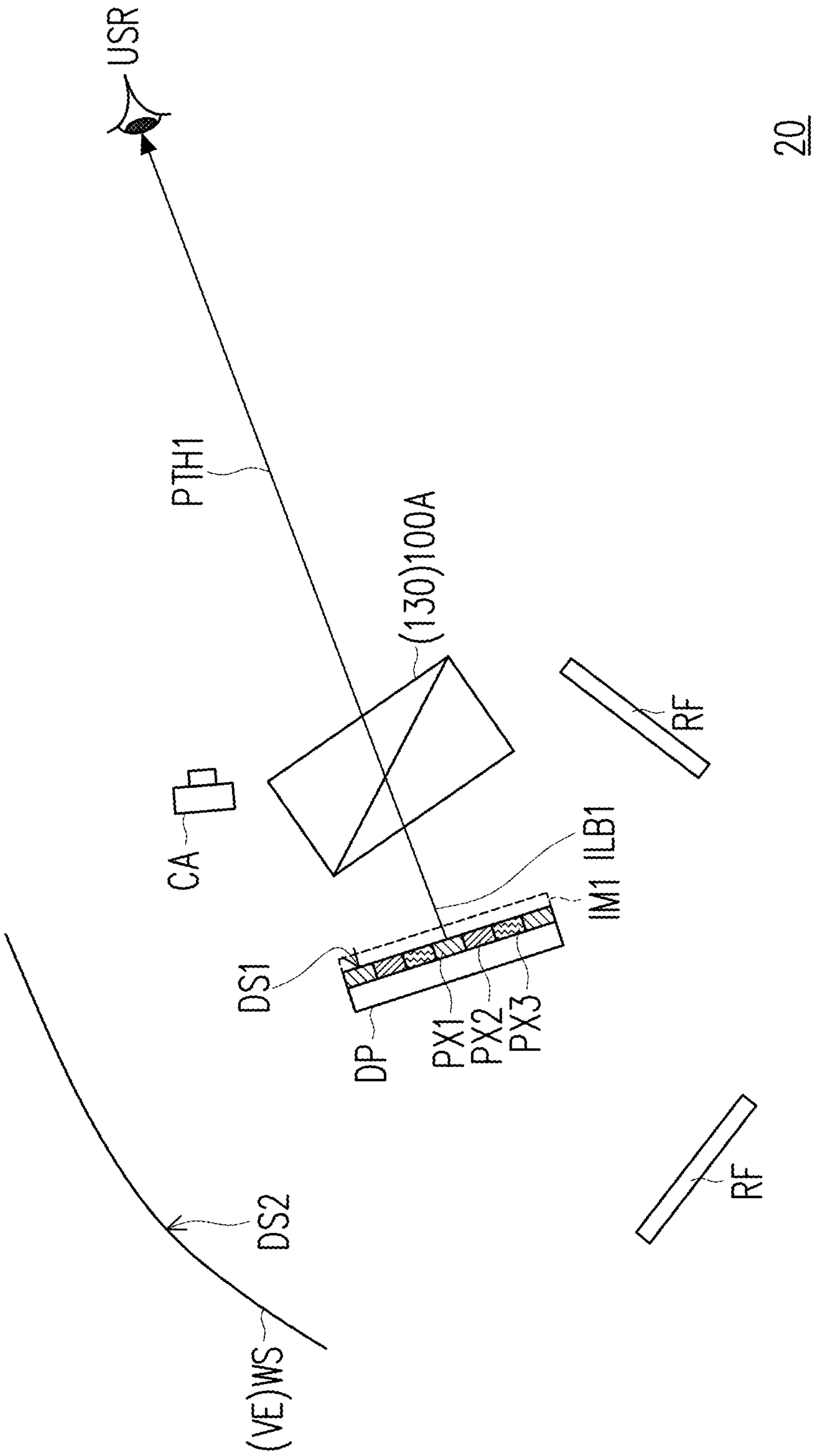
FIGS. 2A to 2C are schematic views of a display apparatus operating in different modes according to the second embodiment of the disclosure.
Figure 2B:
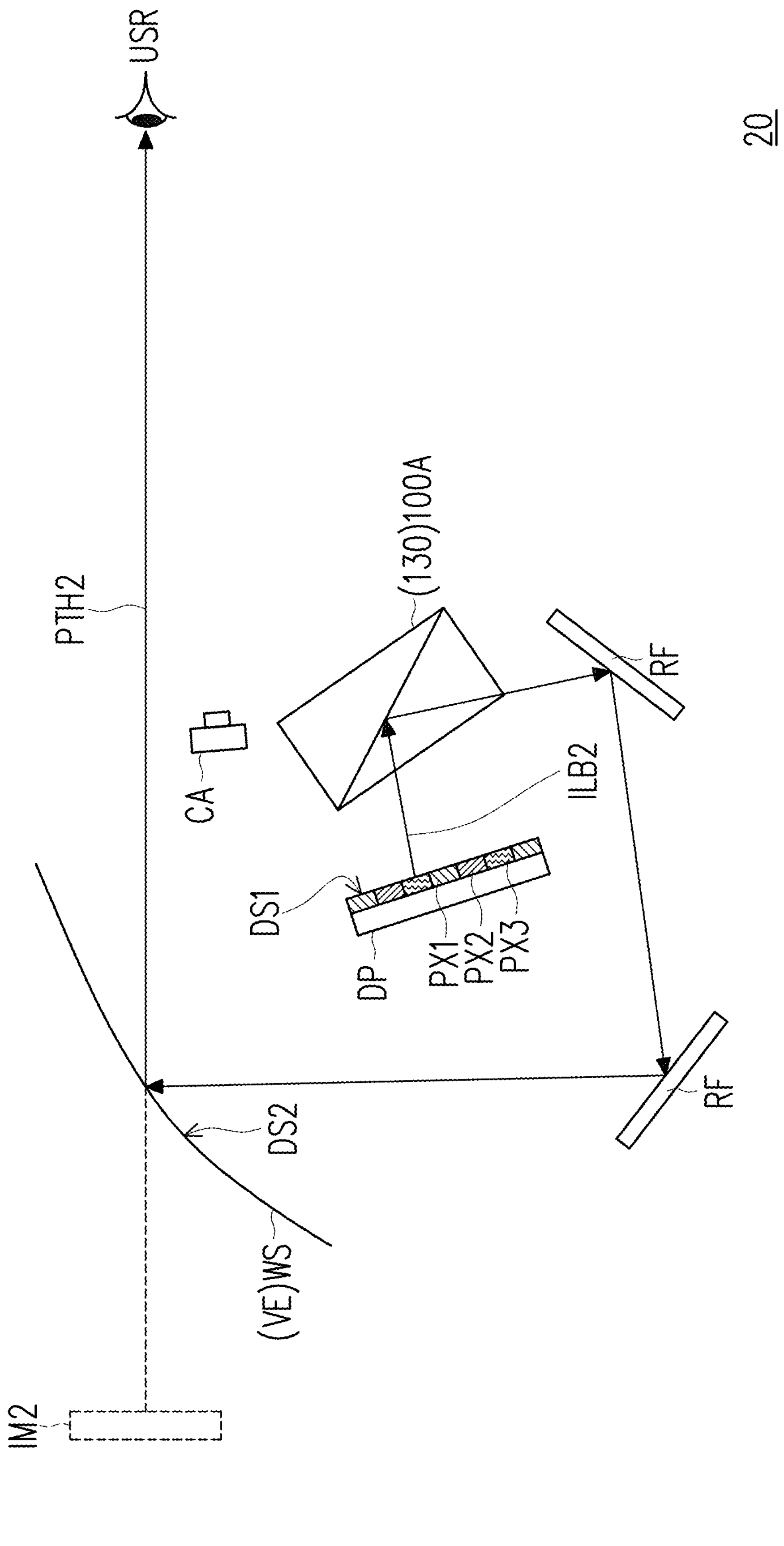
Figure 2C:
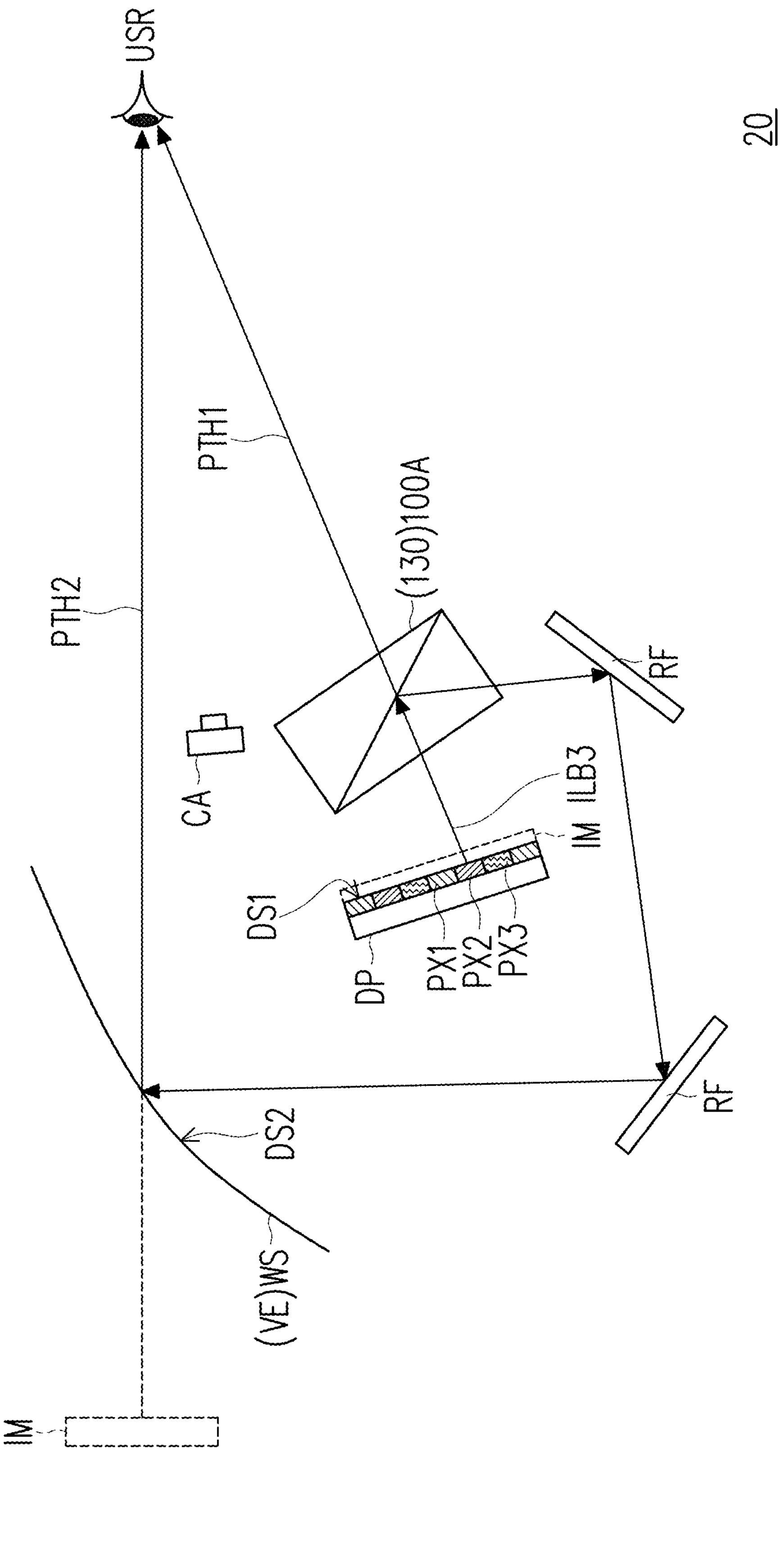

FIGS. 2A to 2C are schematic views of a display apparatus operating in different modes according to the second embodiment of the disclosure. Referring to FIG. 2A and FIG. 2B, the difference between a display apparatus 20 of this embodiment and the display apparatus 10 of FIG. 1A lies in that a composition and an operation principle of the optical path selection module are different. Specifically, in this embodiment, an optical path selection module 100A may include a dichroic element 130, and the dichroic element 130 is, for example, a dichroic mirror, but is not limited thereto.

For example, in this embodiment, the dichroic element 130 is adapted to reflect the blue light from the third pixel PX3 and a part of the green light from the second pixel PX2, and enable the red light from the first pixel PX1 and another part of the green light from the second pixel PX2 to penetrate. It should be noted that the color light reflected by the dichroic element 130 or/and penetrating the dichroic element 130 may be adjusted according to actual application and is not limited thereto. For example, the dichroic element may also allow the blue light to penetrate and reflect the red light.

Referring to FIG. 2A, when the display apparatus 20 is set in the dashboard mode, multiple first pixels PX1 of the display panel DP are enabled to emit an image beam ILB1 of the red color (i.e. a first color). The image beam ILB1 may penetrate the dichroic mirror (or the dichroic element 130) and be transmitted along the first optical path PTH1. At this time, the user USR may view the first image IM1 (such as the in-vehicle information) presented by the display panel DP through the first display surface DS1.

Referring to FIG. 2B, when the display apparatus 20 is set in the head-up display mode, multiple third pixels PX3 of the display panel DP are enabled to emit an image beam ILB2 of the blue color (i.e. a second color). The image beam ILB2 may be reflected by the dichroic mirror and transmitted along the second optical path PTH2. At this time, the user USR may view the second image IM2 (such as the navigation information or the dynamic information while driving) presented by the display panel DP through the second display surface DS2.

Referring to FIG. 2C, when the display apparatus 20 is set in the hybrid mode, multiple second pixels PX2 of the display panel DP are enabled to emit an image beam ILB3 of the green color (i.e. a third color). In particular, a part of the image beam ILB3 is adapted to penetrate the dichroic mirror (or the dichroic element 130) and be transmitted along the first optical path PTH1, while another part of the image beam ILB3 is adapted to be reflected by the dichroic mirror and transmitted along the second optical path PTH2. At this time, the user USR may simultaneously view the image IM (such as the mixed information of the in-vehicle information and the dynamic information while driving) presented on the display panel DP through the first display surface DS1 and the second display surface DS2.

However, the disclosure is not limited thereto. In another embodiment, when the display apparatus 20 is set in the hybrid mode, the first pixel PX1 and the third pixel PX3 of the display panel DP may be simultaneously enabled to respectively emit the image beam of the red color (i.e. the first color) and the image beam of the blue color (i.e. the second color). The red image beam may penetrate the dichromatic mirror and be transmitted along the first optical path PTH1 (as shown in FIG. 2A), while the blue image beam may be reflected by the dichromatic mirror and transmitted along the second optical path PTH2 (as shown in FIG. 2B). At this time, the display panel DP may respectively present the first image (such as the in-vehicle information) and the second image (such as the navigation information or the dynamic information while driving) simultaneously on the first display surface DS1 and the second display surface DS2 for viewing by the user USR.

Through the effects of reflection and transmission of the dichroic element 130 on different colored lights, the optical path selection module 100A is allowed to guide the image beam ILB1 and the image beam ILB2 from the display panel DP to different optical paths, and the image of the display panel DP is presented on the desired display surface according to the movement of the user USR. In this way, disposing too many display panels for displaying different image information and resulting in the decrease in the actual utilization rate of these display panels and the increase in the energy consumption may be prevented. In other words, the display apparatus 20 of this embodiment utilizes the single display panel DP to switch or display simultaneously between multiple display surfaces, which may not only meet various display requirements, but also effectively reduce the energy consumption in operation.

Figure 3A:
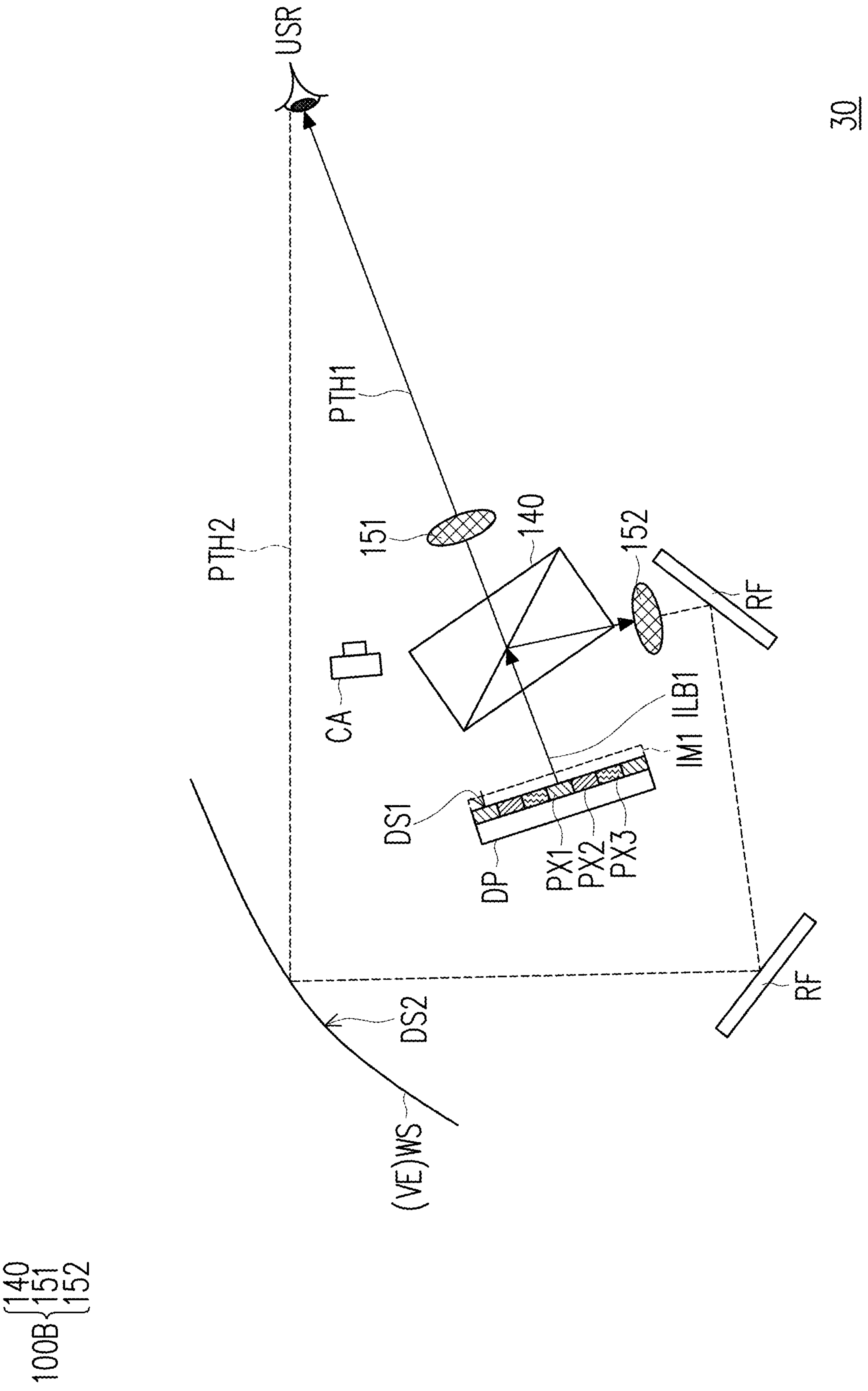
FIGS. 3A to 3C are schematic views of a display apparatus operating in different modes according to the third embodiment of the disclosure.
Figure 3B:
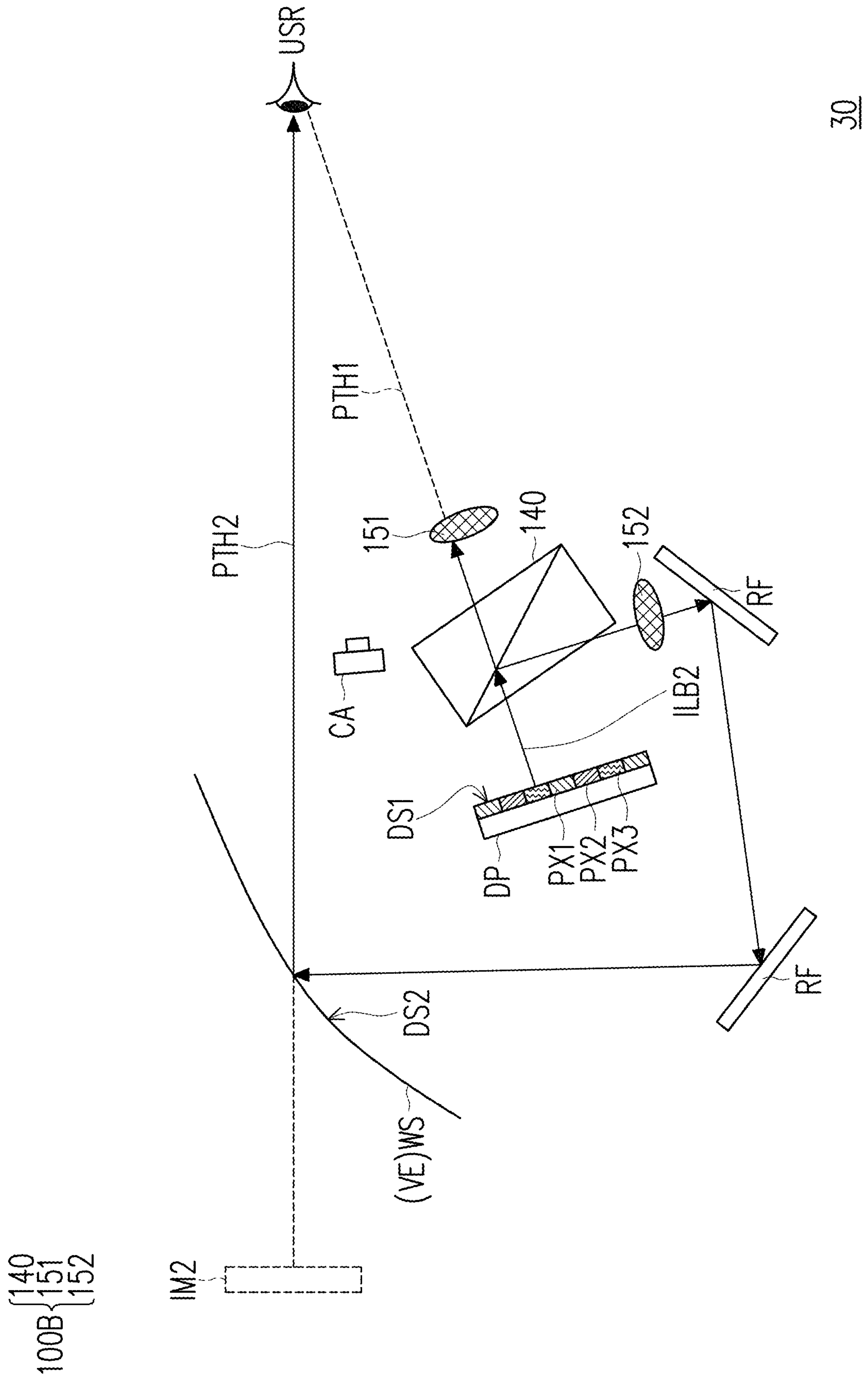
Figure 3C:
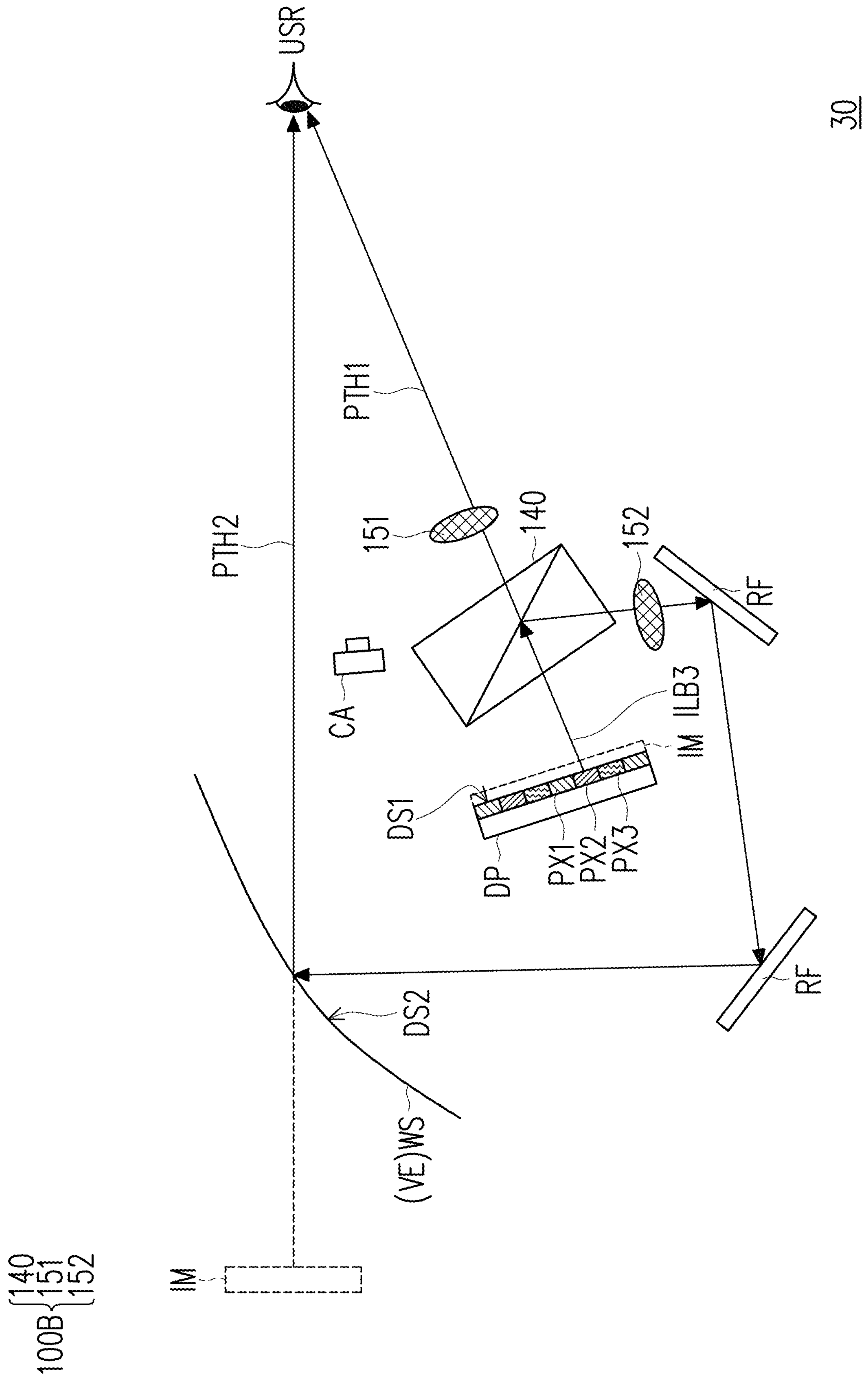

FIGS. 3A to 3C are schematic views of a display apparatus operating in different modes according to the third embodiment of the disclosure. Referring to FIG. 3A and FIG. 3B, the difference between a display apparatus 30 of this embodiment and the display apparatus 20 of FIG. 2A lies in that the composition and operation principle of the optical path selection module are different. Specifically, an optical path selection module 100B of the display apparatus 30 may include a beam splitting element 140, a first filter element 151 and a second filter element 152. In this embodiment, the beam splitting element 140 is, for example, a beam splitter (BS), and the filter element is, for example, a tunable bandpass filter (TBPF). However, the disclosure is not limited thereto.

In this embodiment, regardless of the color of the image beam, the beam splitting element 140 is adapted to allow a part of the image beam to penetrate and reflect another part of the image beam. The first filter element 151 is disposed on the transmission path of part of the image beam that may penetrate the beam splitting element 140. The second filter element 152 is disposed on the transmission path of another part of the image beam reflected by the beam splitting element 140.

For example, in this embodiment, the first filter element 151 is adapted to allow the red light and the green light to penetrate and block the blue light. The second filter element 152 is adapted to allow the blue light and the green light to penetrate and block the red light. It should be noted that the color light blocked by the filter element or the color light that may penetrate the filter element may be adjusted according to actual application and is not limited thereto.

Referring to FIG. 3A, when the display apparatus 30 is set in the dashboard mode, multiple first pixels PX1 of the display panel DP are enabled to emit the image beam ILB1 of the red color (i.e. the first color). A part of the image beam ILB1 may penetrate the beam splitting element 140 and the first filter element 151, and be transmitted along the first optical path PTH1. In particular, the second filter element 152 is disposed on the transmission path of another part of the image beam ILB1 reflected by the beam splitting element 140, and is adapted to block the red light. Therefore, another part of the image beam ILB1 reflected by the beam splitting element 140 is blocked by the second filter element 152 and may not be transmitted along the second optical path PTH2. At this time, the user USR may only view the first image IM1 (such as the in-vehicle information) presented by the display panel DP through the first display surface DS1.

Referring to FIG. 3B, when the display apparatus 30 is set in the head-up display mode, multiple third pixels PX3 of the display panel DP are enabled to emit the image beam ILB2 of the blue color (i.e. the second color). In particular, the first filter element 151 is disposed on a transmission path of a part of the image beam ILB2 penetrating the beam splitting element 140 and is adapted to block blue light. Therefore, a part of the image beam ILB2 penetrating the beam splitting element 140 is blocked by the first filter element 151 and may not be transmitted along the first optical path PTH1. Another part of the image beam ILB2 reflected by the beam splitting element 140 may penetrate the second filter element 152 and be transmitted along the second optical path PTH2. At this time, the user USR may only view the second image IM2 (such as the navigation information or the dynamic information while driving) presented by the display panel DP through the second display surface DS2.

Referring to FIG. 3C, when the display apparatus 30 is set in the hybrid mode, multiple second pixels PX2 of the display panel DP are enabled to emit the image light ILB3 of the green color (i.e. the third color). In particular, a part of the image beam ILB3 penetrating the light splitting element 140 may penetrate the first filter element 151 and be transmitted along the first optical path PTH1, while another part of the image beam ILB3 reflected by the beam splitting element 140 may penetrate the second filter element 152 and be transmitted along the second optical path PTH2. At this time, the user USR may simultaneously view the image IM (such as the mixed information of the in-vehicle information and the dynamic information while driving) presented on the display panel DP through the first display surface DS1 and the second display surface DS2.

Through the effects of blocking and transmission of the filter element on the lights of different colors, the image beam ILB1 and image beam ILB2 from the display panel DP may be transmitted by different optical paths through the optical path selection module 100B, and the image of the display panel DP is presented on the desired display surfaces according to the movement of the user USR. In this way, disposing too many display panels for displaying different image information and resulting in the decrease in the actual utilization rate of these display panels and the increase in the energy consumption may be prevented. In other words, the display apparatus 30 of this embodiment utilizes the single display panel DP to switch or display simultaneously between multiple display surfaces, which may not only meet various display requirements, but also effectively reduce the energy consumption in operation.

Figure 4A:
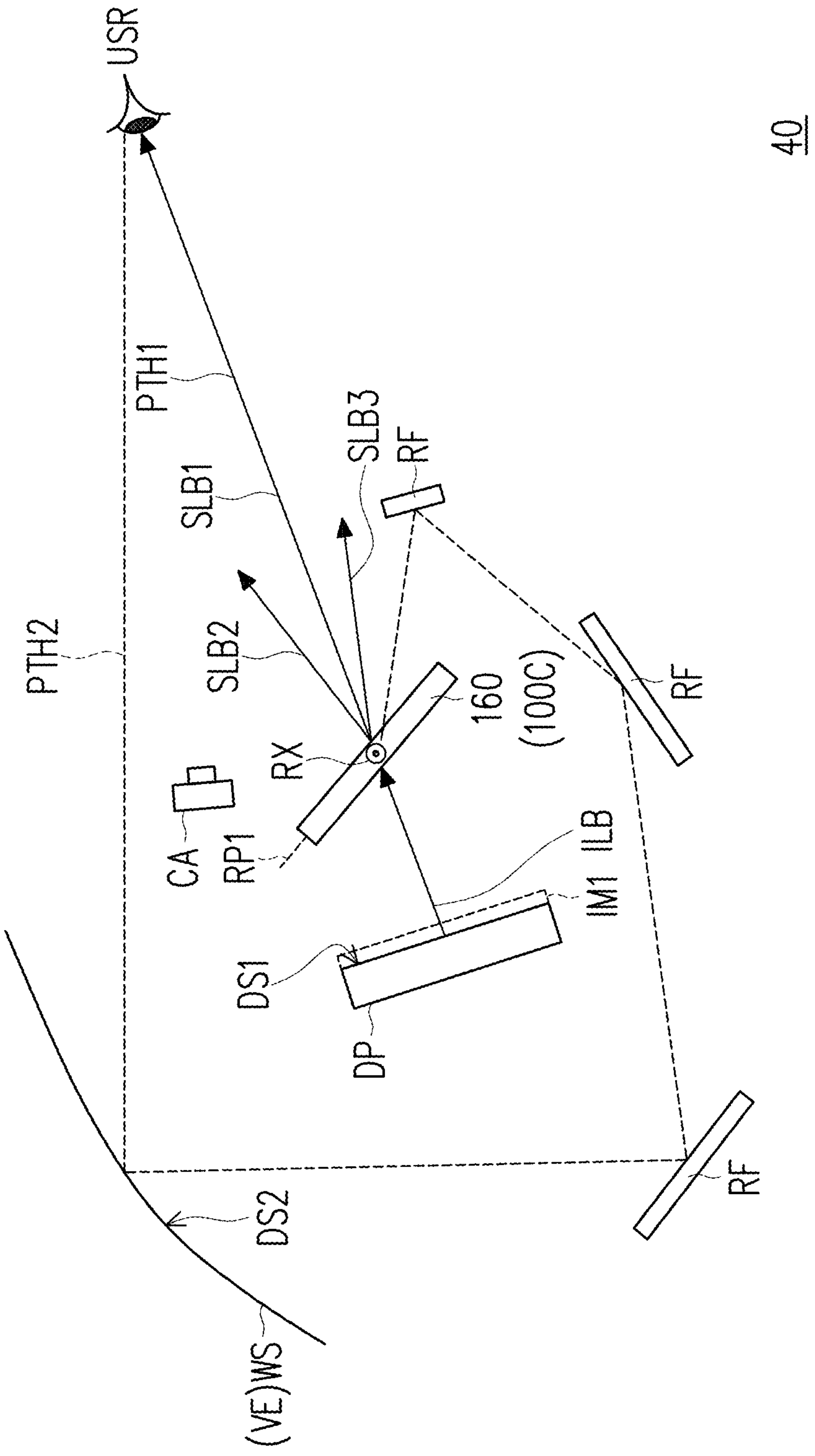
FIGS. 4A to 4C are schematic views of a display apparatus operating in different modes according to the fourth embodiment of the disclosure.
Figure 4B:
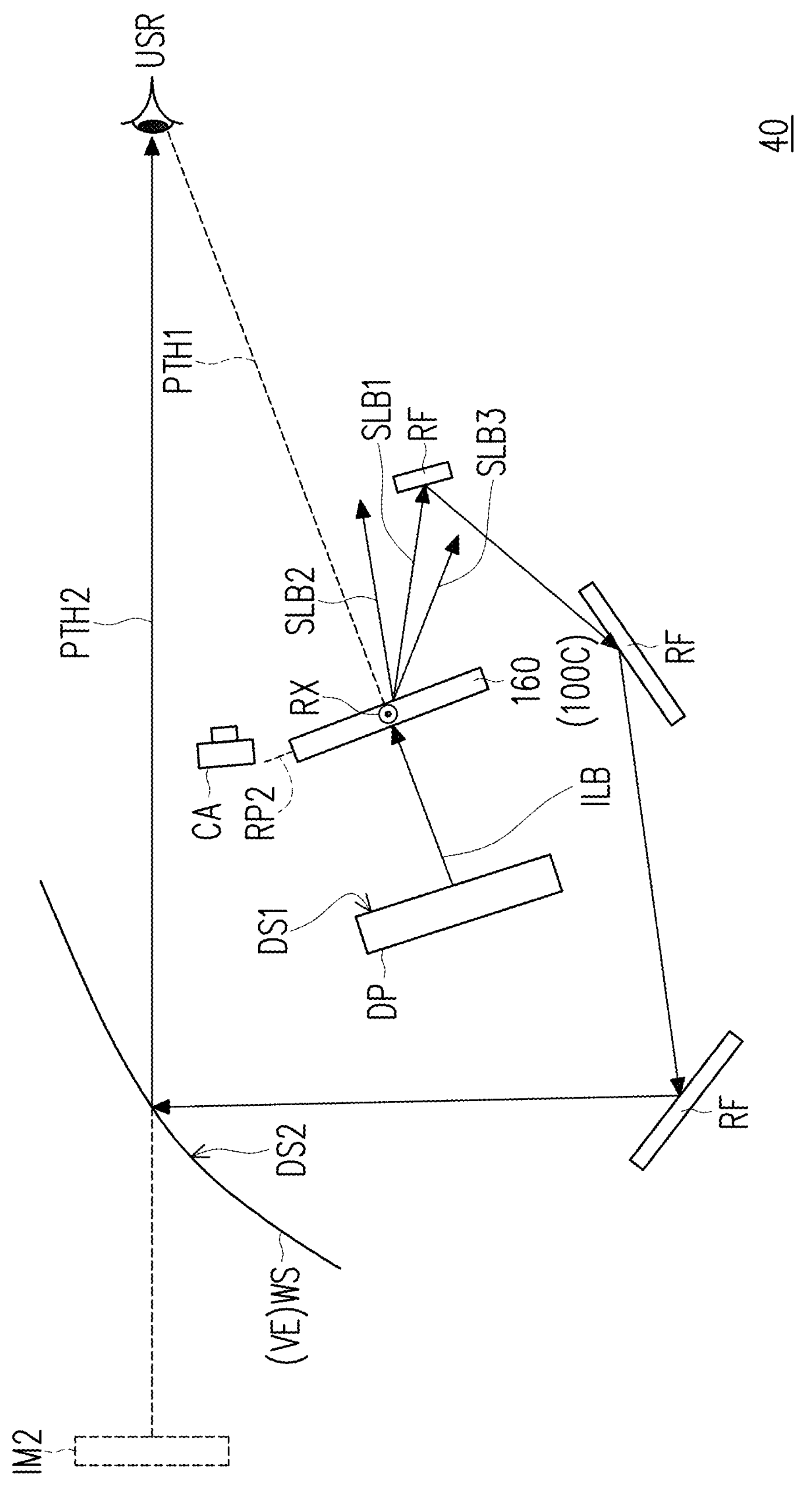
Figure 4C:
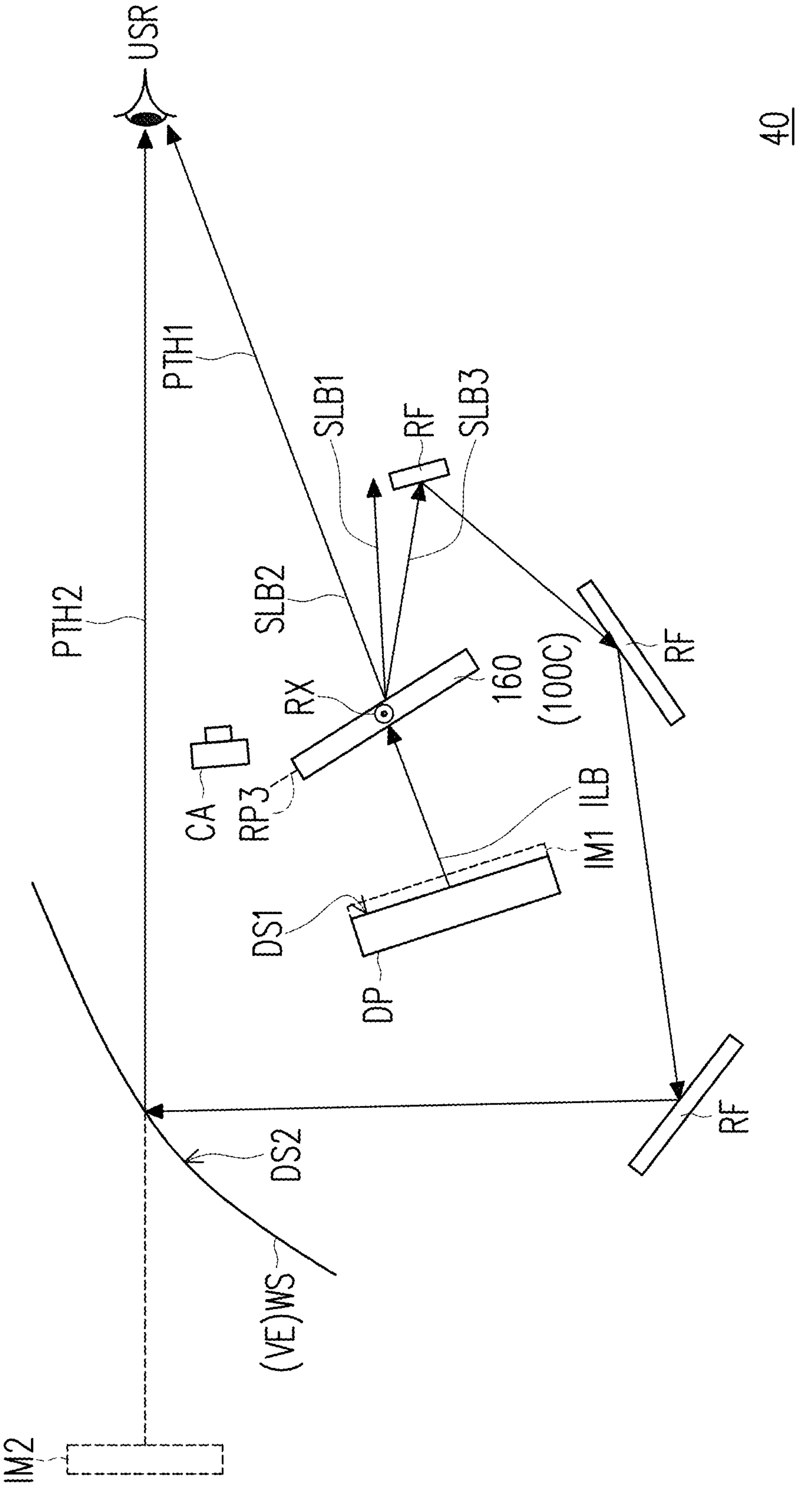

FIGS. 4A to 4C are schematic views of a display apparatus operating in different modes according to the fourth embodiment of the disclosure. Referring to FIG. 4A and FIG. 4B, the difference between a display apparatus 40 of this embodiment and the display apparatus 10 in FIG. 1A lies in that the composition and operation principle of the optical path selection module are different. Specifically, an optical path selection module 100C of the display apparatus 40 may include a dispersion element 160. In this embodiment, the dispersion element 160 is, for example, a transmission grating or a prism, but is not limited thereto.

In particular, in this embodiment, the dispersion element 160 is adapted to switch between multiple rotating positions along a rotating axis RX, such as a first rotating position RP1 (as shown in FIG. 4A), a second rotating position RP2 (as shown in FIG. 4B), and a third rotating position RP3 (as shown in FIG. 4C). After the image beam ILB from the display panel DP penetrates the dispersion element 160 (for example, penetrates a grating), the image beam ILB may be separated into a first sub-beam SLB1 with the first color (for example, the green color), a second sub-beam SLB1 with the second color (for example, the red color), and the third sub-beam SLB3 with the third color (for example, the blue color).

Referring to FIG. 4A, when the display apparatus 40 is set in the dashboard mode, the dispersion element 160 is set at the first rotating position RP1. Therefore, the first sub-beam SLB1 split out after the image beam ILB penetrates the dispersive element 160 is transmitted along the first optical path PTH1. At this time, the user USR may view the first image IM1 (such as the in-vehicle information) presented by the display panel DP through the first display surface DS1.

Referring to FIG. 4B, when the display apparatus 40 is set in the head-up display mode, the dispersion element 160 is set at the second rotating position RP2. Therefore, the first sub-beam SLB1 split out after the image beam ILB penetrates the dispersive element 160 is transmitted along the second optical path PTH2. At this time, the user USR may view the second image IM2 (such as the navigation information or the dynamic information while driving) presented by the display panel DP through the second display surface DS2. In order to meet the design requirements of the optical path, in this embodiment, the number of the reflective elements RF disposed on the second optical path PTH2 is, for example, three, but it is not limited thereto.

Referring to FIG. 4C, when the dispersion element 160 rotates to the third rotating position RP3 along the rotating axis RX, the second sub-beam SLB2 with the second color split out after the image beam ILB penetrates the dispersion element 160 is transmitted along the first optical path PTH1, and the third sub-beam SLB3 with the third color split out after the image beam ILB penetrates the dispersion element 160 is transmitted along the second optical path PTH2. At this time, the display panel DP may respectively present the first image IM1 (such as the in-vehicle information) and the second image IM2 (such as the dynamic information while driving) simultaneously on the first display surface DS1 and the second display surface DS2 for viewing by the user USR. That is, the display apparatus 40 is now operating in the hybrid mode.

Through the mechanism that the dispersion element 160 has different light emission angles for different colored lights and the dispersion element 160 is rotatable, the optical path selection module 100C may split the image beam ILB from the display panel DP into the sub-beams of the different colors, orient the sub-beams to different optical paths, and the image of the display panel DP is presented on the desired display surfaces according to the movement of the user USR. In this way, disposing too many display panels for displaying different image information and resulting in the decrease in the actual utilization rate of these display panels and the increase in the energy consumption may be prevented. In other words, the display apparatus of this embodiment utilizes the single display panel DP to switch or display simultaneously between multiple display surfaces, which may not only meet various display requirements, but also effectively reduce the energy consumption in operation.

FIGS. 5A to 5D are schematic views of a display apparatus operating in different modes according to the fifth embodiment of the disclosure. Referring to FIG. 5A to FIG. 5D, the difference between a display apparatus 50 of this embodiment and the display apparatus 10 of FIG. 1A lies in that the composition and operation principle of the optical path selection module are different. Specifically, an optical path selection module 100D of the display apparatus 50 further includes the dichroic element 130 in addition to the polarizing beam splitting element 110 and the electrically controlled polarization modulator 120. The dichroic element 130 is, for example, the dichroic mirror, but is not limited thereto.

In this embodiment, the dichroic element 130 is disposed on the transmission path of the image beam penetrating the polarizing beam splitting element 110. The image beam with the first color penetrating the polarizing beam splitting element 110 is adapted to penetrate the dichroic element 130 and be transmitted along the first optical path PTH1. In particular, the image beam with the second color penetrating the polarizing beam splitting element 110 is adapted to be reflected by the dichroic element 130 and transmitted along a third optical path PTH3 (as shown in FIG. 5C). The image beam transmitted along the third optical path PTH3 is adapted to present a third image IM3 on a third display surface DS3, and the third image IM3 is different from the first image IM1 and the second image IM2.

The display apparatus 50 of this embodiment is adapted to be installed in the vehicle VE for the in-vehicle information and the dynamic information while driving. For example, the first display surface DS1 may be disposed on the display panel DP, the second display surface DS2 may be disposed on the windshield WS of the vehicle VE, and the third display surface DS3 may be disposed on a vehicle pillar PL (such as a A-pillar) at one side of the windshield WS. The display panel DP may be used as the vehicle dashboard for displaying the in-vehicle information on the first display surface DS1, and the head-up displayer for displaying the dynamic information while driving on the second display surface DS2. In addition, the display panel DP may be used to display a warning signal on the third display surface DS3. However, the disclosure is not limited thereto.

Furthermore, a reflective mirror RM may be disposed on the vehicle pillar PL, and the third display surface DS3 is disposed on the reflective mirror RM. The reflective mirror RM is used to reflect the image beam from the dichroic element 130 and transmit thereof along the third optical path PTH3.

The configuration and operation principle of the polarizing beam splitting element 110 and the electrically controlled polarization modulator 120 of this embodiment are similar to those of the polarizing beam splitting element 110 and the electrically controlled polarization modulator 120 of the embodiment in FIG. 1A. The operation principle of the dichroic element 130 of this embodiment is similar to that of the dichroic element 130 of the embodiment in FIG. 2A. Therefore, for a detailed description, please refer to the relevant paragraphs of the above embodiment, which is not repeated herein. The following describes only the operation principle of the optical path selection module 100D of this embodiment as an example for exemplary description.

Figure 5A:
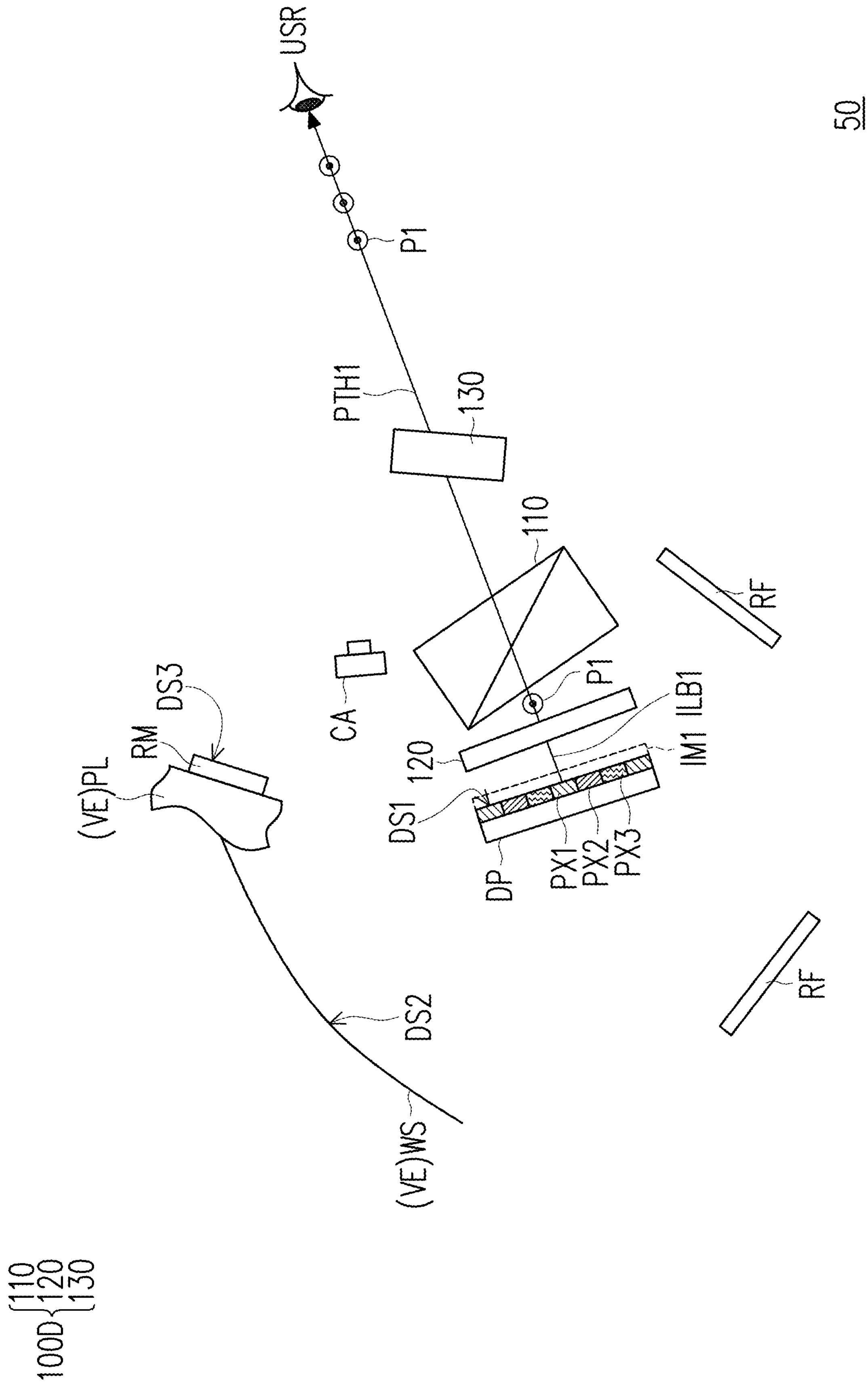
FIGS. 5A to 5D are schematic views of a display apparatus operating in different modes according to the fifth embodiment of the disclosure.

Referring to FIG. 5A, when the display apparatus 50 is set in the dashboard mode, multiple first pixels PX1 of the display panel DP are enabled to emit the image beam ILB1 of the red color (i.e. the first color), and the image beam ILB1 has the first polarization state P1 after penetrating the electrically controlled polarization modulator 120. The image beam ILB1 with the first polarization state P1 and the first color is adapted to penetrate the dichroic mirror (or the dichroic element 130) and be transmitted along the first optical path PTH1. At this time, the user USR may view the first image IM1 (such as the in-vehicle information) presented by the display panel DP through the first display surface DS1.

Figure 5B:
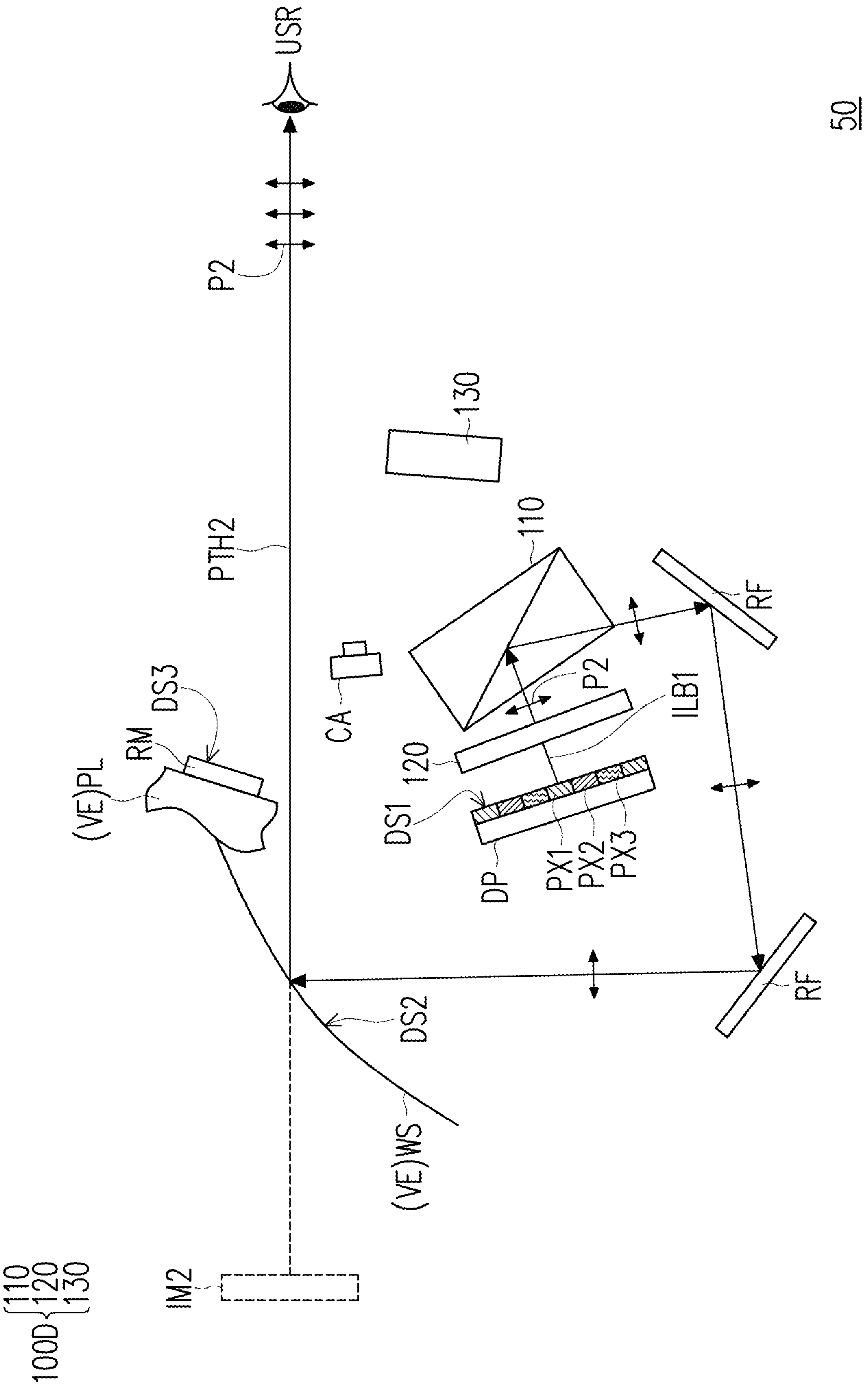
Figure 5C:
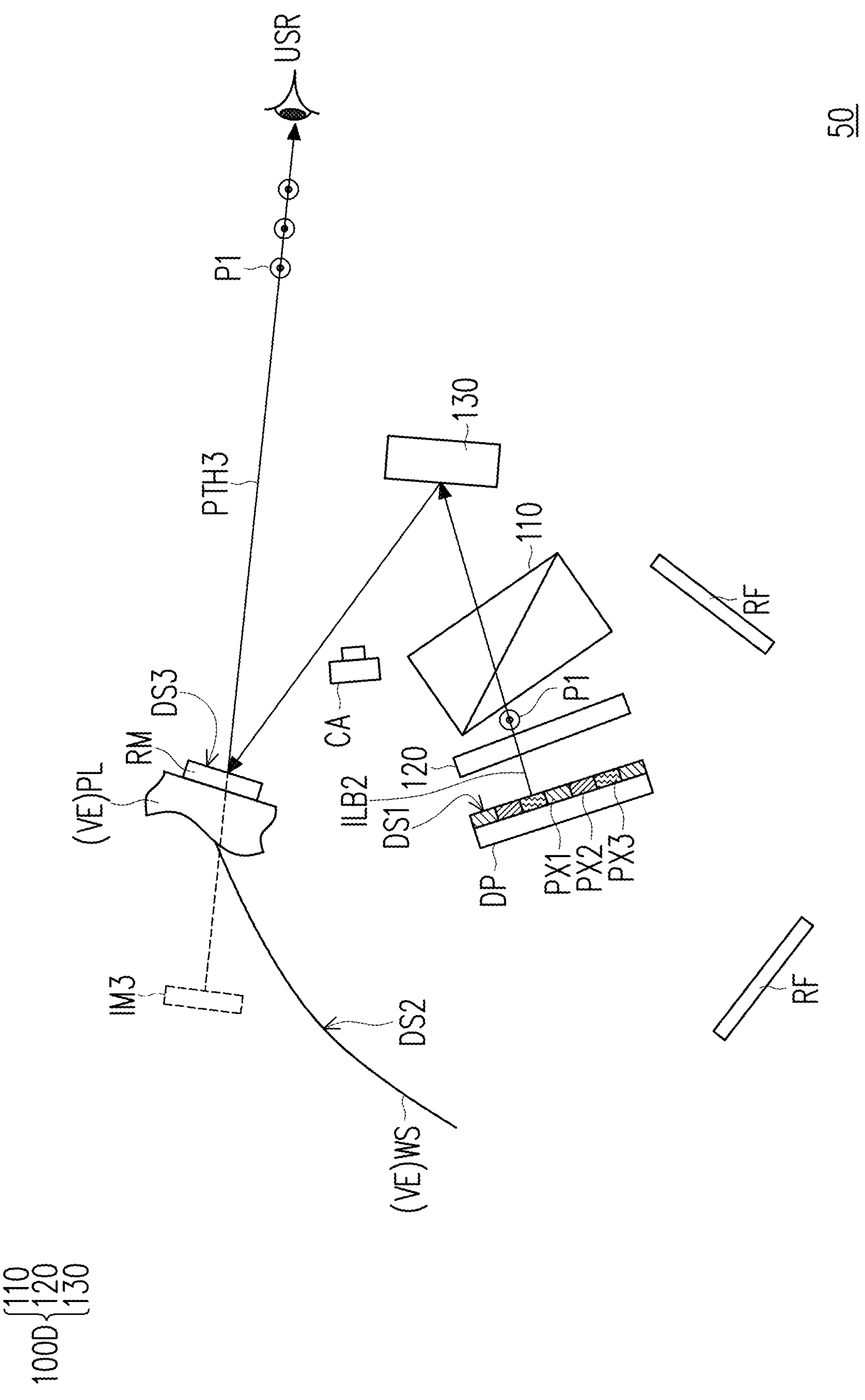

Referring to FIG. 5B, when the image beam ILB1 has the second polarization state P2 after penetrating the electrically controlled polarization modulator 120, the image beam ILB1 is adapted to be reflected by the polarizing beam splitting element 110 and transmitted along the second optical path PTH2. At this time, the user USR may view the second image IM2 (such as the navigation information or the dynamic information while driving) presented by the display panel DP through the second display surface DS2 on the windshield WS That is, the display apparatus 50 is now operating in the head-up display mode.

Referring to FIG. 5C, when the display apparatus 50 is set in a warning mode, multiple third pixels PX3 of the display panel DP are enabled to emit the image beam ILB2 of the blue color (i.e. the second color), and the image beam ILB has the first polarization state P1 after penetrating the electrically controlled polarization modulator 120. The image beam ILB2 with the first polarization state P1 and the second color is adapted to be reflected by the dichroic element 130 and transmitted along the third optical path PTH3. At this time, the user USR may view the third image IM3 (such as the warning signal) presented by the display panel DP through the third display surface DS3.

Figure 5D:
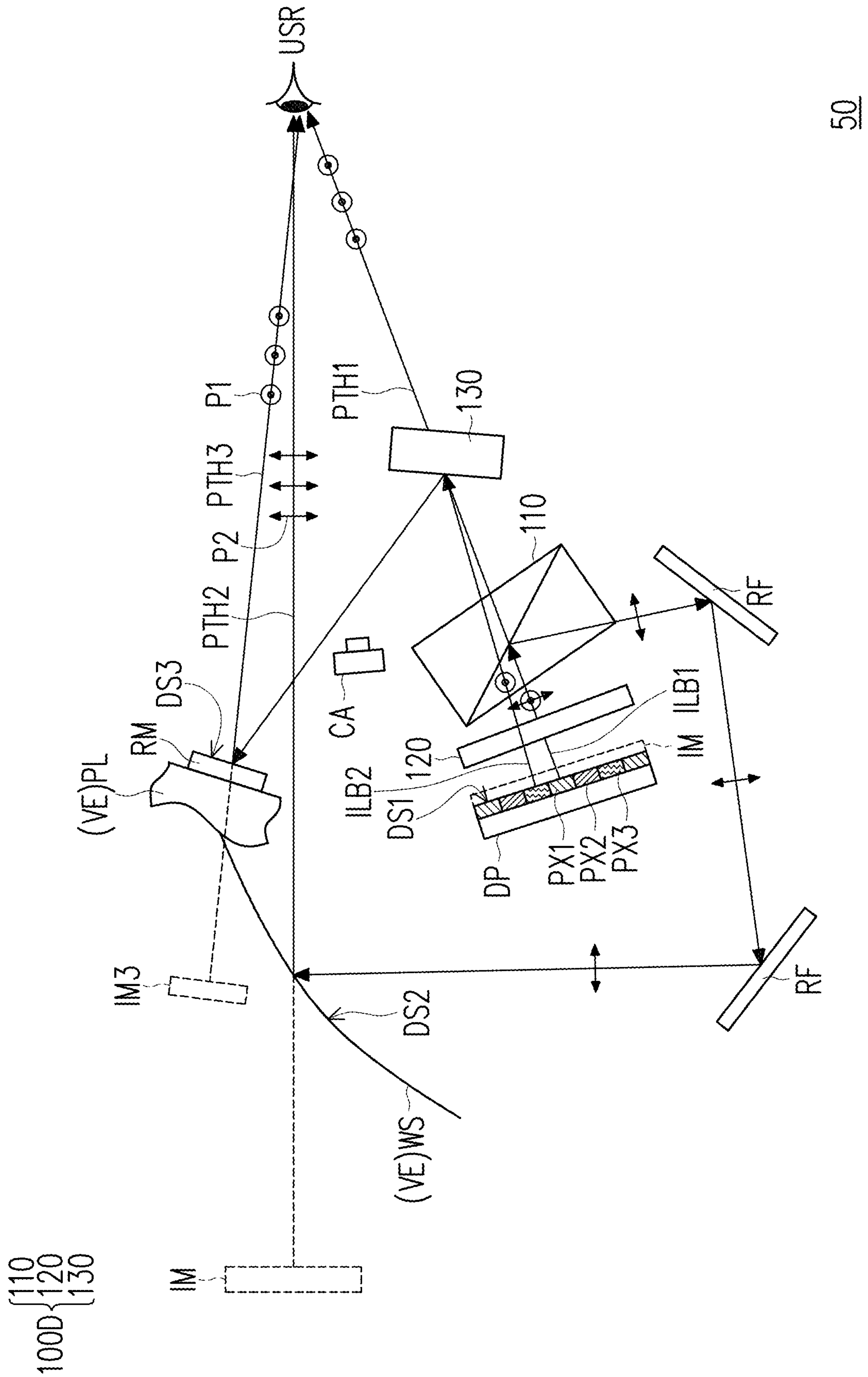

Please refer to FIG. 5D, when the display apparatus 50 is set in the hybrid mode, the first pixel PX1 and the third pixel PX3 of the display panel DP are simultaneously enabled to respectively emit the image beam ILB1 of the red color (i.e. first color) and the image beam ILB2 of the blue color (i.e. the second color). In particular, the image beam ILB1 has both the polarization component of the first polarization state P1 and the polarization component of the second polarization state P2 (i.e. the third polarization state) after penetrating the electrically controlled polarization modulator 120. A part of the image beam ILB1 with the first polarization state P1 and the first color may penetrate the polarizing beam splitting element 110 and the dichroic element 130 and be transmitted along the first optical path PTH1, while another part of the image beam ILB with the second polarization state P2 and the first color may be reflected by the polarizing beam splitting element 110 and transmitted along the second optical path PTH2. On the other hand, the image beam ILB2 with the first polarization state P1 and the second color is adapted to penetrate the polarizing beam splitting element 110 and be reflected by the dichroic element 130 to be transmitted along the third optical path PTH3. At this time, the display panel DP may present the image IM (such as the mixed information of the in-vehicle information and the dynamic information while driving) and the third image IM3 (such as the warning signal) simultaneously on the first display surface DS1, the second display surface DS2, and the third display surface DS3 for viewing by the user USR.

Through the polarization state switching of the electrically controlled polarization modulator 120 and the effects of reflection and transmission of the dichroic element 130 on the lights of different colors, the image beam ILB1 and the image beam ILB2 from the display panel DP may be transmitted in three ways by passing through the optical path selection module 100D, and the image of the display panel DP is presented on the desired display surfaces according to the movement of the user USR. In this way, disposing too many display panels for displaying different image information and resulting in the decrease in the actual utilization rate of these display panels and the increase in the energy consumption may be prevented. In other words, the display apparatus 50 of this embodiment utilizes the single display panel DP to switch or display simultaneously between multiple display surfaces, which may not only meet various display requirements, but also effectively reduce the energy consumption in operation.

FIGS. 6A to 6D are schematic views of a display apparatus operating in different modes according to the sixth embodiment of the disclosure. Referring to FIG. 6A to FIG. 6D, the difference between a display apparatus 60 of this embodiment and the display apparatus 10 of FIG. 1A lies in that the composition and operation principle of the optical path selection module are different. Specifically, an optical path selection module 100E of the display apparatus 60 further includes the polarizing beam splitting element 140, the first filter element 151 and the second filter element 152 in addition to the polarizing beam splitting element 110 and the electrically controlled polarization modulator 120. The beam splitting element 140 is, for example, the beam splitter (BS), and the filtering element is, for example, the tunable bandpass filter (TBPF). However, the disclosure is not limited thereto.

In this embodiment, the beam splitting element 140 is disposed on the transmission path of the image beam penetrating the polarizing beam splitting element 110. Regardless of the color of the image beam, the beam splitting element 140 is adapted to allow a part of the image beam to penetrate and reflect another part of the image beam. The first filter element 151 is disposed on the transmission path of part of the image beam that may penetrate the beam splitting element 140, and the second filter element 152 is disposed on the transmission path of another part of the image beam reflected by the beam splitting element 140.

For example, in this embodiment, the first filter element 151 is adapted to allow the red light (i.e. the first color) and the green light (i.e. the third color) to penetrate and block the blue light (i.e. the second color), while the second filter element 152 is adapted to allow the blue light and the green light to penetrate and block the red light. It should be noted that the color light blocked by the filter element or the color light that may penetrate the filter element may be adjusted according to actual application and is not limited thereto.

The display apparatus 60 of this embodiment is adapted to be installed in the vehicle VE for the in-vehicle information and the dynamic information while driving. For example, the first display surface DS1 may be disposed on the display panel DP, the second display surface DS2 may be disposed on the windshield WS of the vehicle VE, and the third display surface DS3 may be disposed on the vehicle pillar PL (such as the A-pillar) at one side of the windshield WS. The display panel DP may be used as the vehicle dashboard for displaying the in-vehicle information on the first display surface DS1, and the head-up displayer for displaying the dynamic information while driving on the second display surface DS2. In addition, the display panel DP may be used to display the warning signal on the third display surface DS3. However, the disclosure is not limited thereto.

Furthermore, the reflective mirror RM may be disposed on the vehicle pillar PL, and the third display surface DS3 is disposed on the reflective mirror RM. The reflective mirror RM is used to reflect the image beam from the dichroic element 130 and transmit thereof along the third optical path PTH3.

The configuration and operation principle of the polarizing beam splitting element 110 and the electrically controlled polarization modulator 120 of this embodiment are similar to those of the polarizing beam splitting element 110 and the electrically controlled polarization modulator 120 of the embodiment in FIG. 1A. In addition, the operation principle of the beam splitting element 140, the first filter element 151, and the second filter element 152 of this embodiment is similar to that of the beam splitting element 140, the first filter element 151, and the second filter element 152 of the embodiment in FIG. 3A. Therefore, for a detailed description, please refer to the relevant paragraphs of the above embodiment, which is not repeated herein. The following describes only the operation principle of the optical path selection module 100E of this embodiment as an example for exemplary description.

Figure 6A:
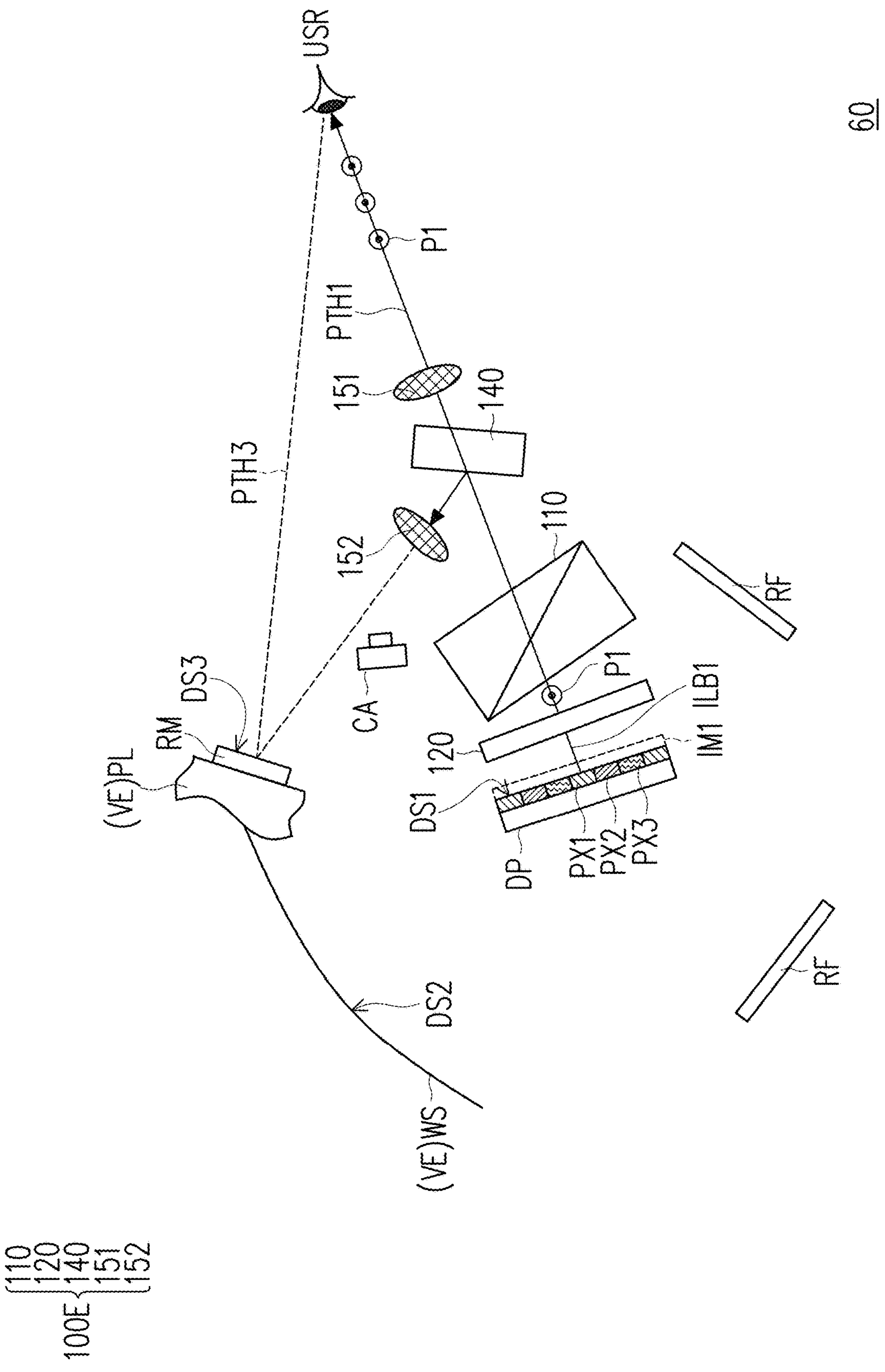
FIGS. 6A to 6D are schematic views of a display apparatus operating in different modes according to the sixth embodiment of the disclosure.

Referring to FIG. 6A, when the display apparatus 60 is set in the dashboard mode, multiple first pixels PX1 of the display panel DP are enabled to emit the image beam ILB1 of the red color (i.e. the first color), and the image beam ILB1 has the first polarization state P1 after penetrating the electrically controlled polarization modulator 120. The image beam ILB1 with the first polarization state P1 and the first color is adapted to penetrate the beam splitting element 140 and the first filter element 151 and be transmitted along the first optical path PTH1. In particular, another part of the image beam ILB1 reflected by the beam splitting element 140 is blocked by the second filter element 152 and is not transmitted along the third optical path PTH3. At this time, the user USR may only watch the first image IM1 (such as the in-vehicle information) presented by the display panel DP through the first display surface DS1.

Figure 6B:
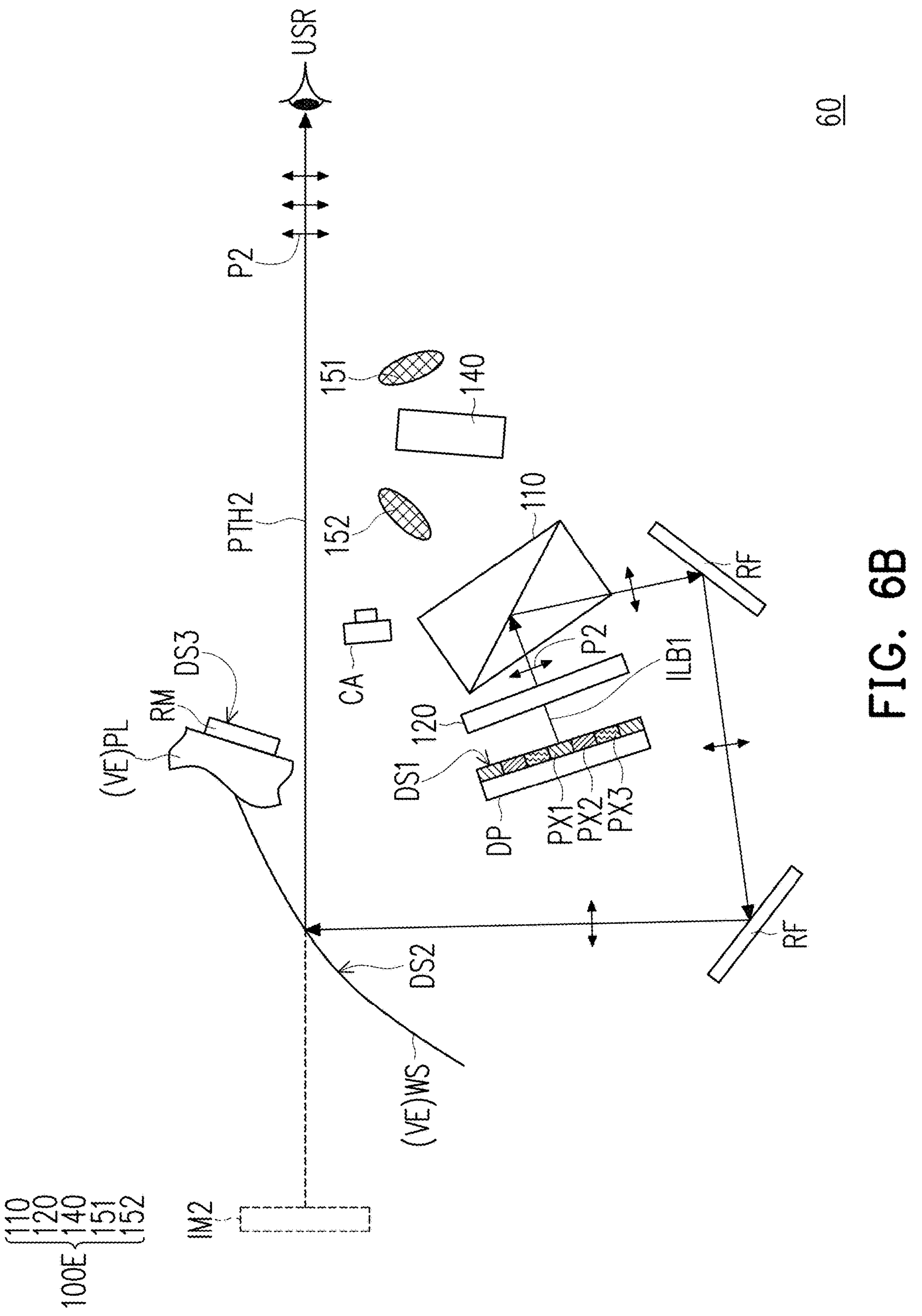

Referring to FIG. 6B, when the image beam ILB1 has the second polarization state P2 after penetrating the electrically controlled polarization modulator 120, the image beam ILB1 is adapted to be reflected by the polarizing beam splitting element 110 and transmitted along the second optical path PTH2. At this time, the user USR may view the second image IM2 (such as the navigation information or the dynamic information while driving) presented by the display panel DP through the second display surface DS2 on the windshield WS That is, the display apparatus 60 is now operating in the head-up display mode.

Figure 6C:
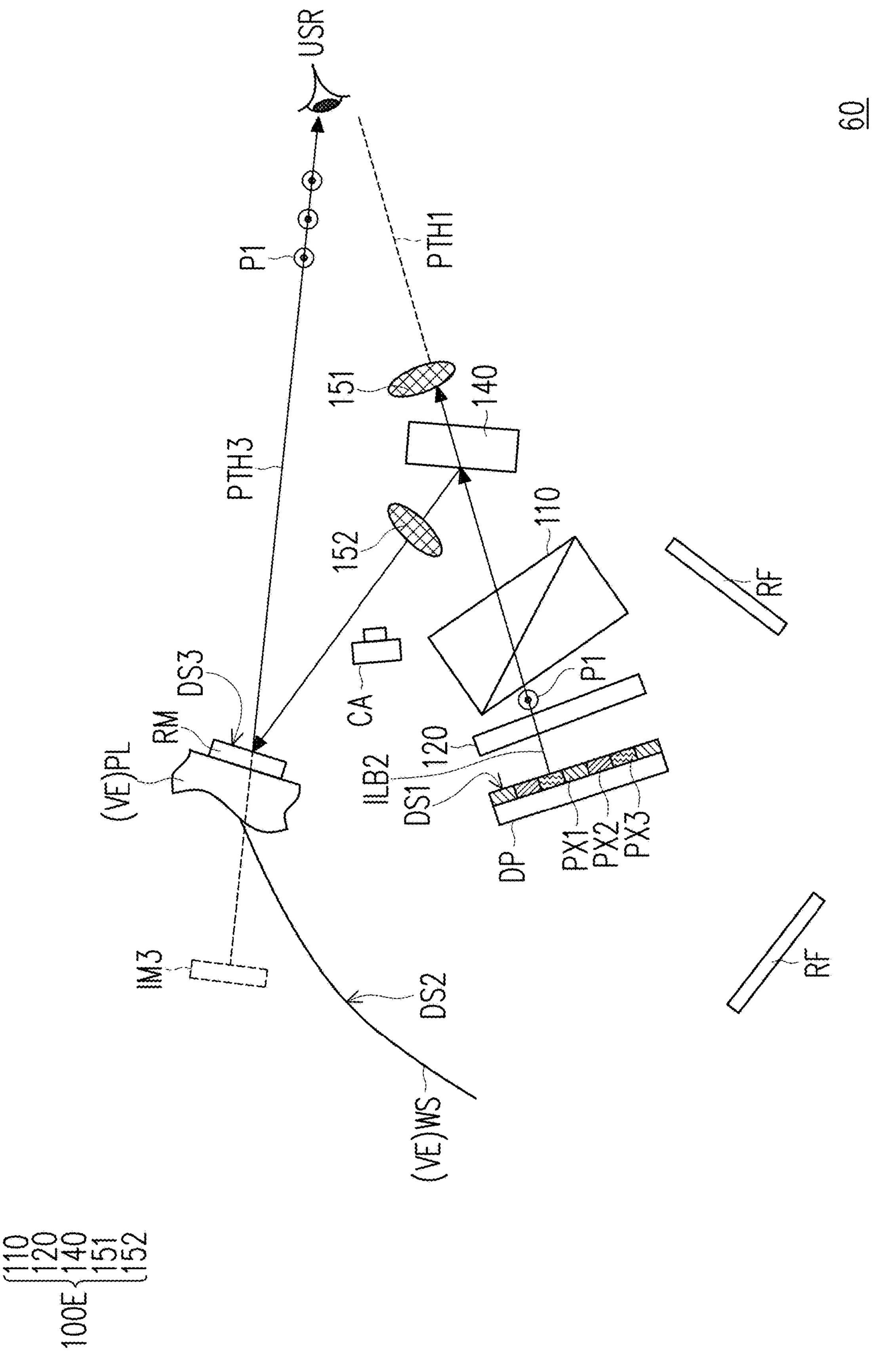

Referring to FIG. 6C, when the display apparatus 60 is set in the warning mode, multiple third pixels PX3 of the display panel DP are enabled to emit the image beam ILB2 of the blue color (i.e. the second color), and have the first polarization state P1 after penetrating the electrically controlled polarization modulator 120. In particular, a part of the image beam ILB2 penetrating the beam splitting element 140 is blocked by the first filter element 151 and is not transmitted along the first optical path PTH1. Another part of the image beam ILB2 reflected by the beam splitting element 140 may penetrate the second filter element 152 and be transmitted along the third optical path PTH3. At this time, the user USR may view the third image IM3 (such as the warning signal) presented by the display panel DP through the third display surface DS3.

Figure 6D:
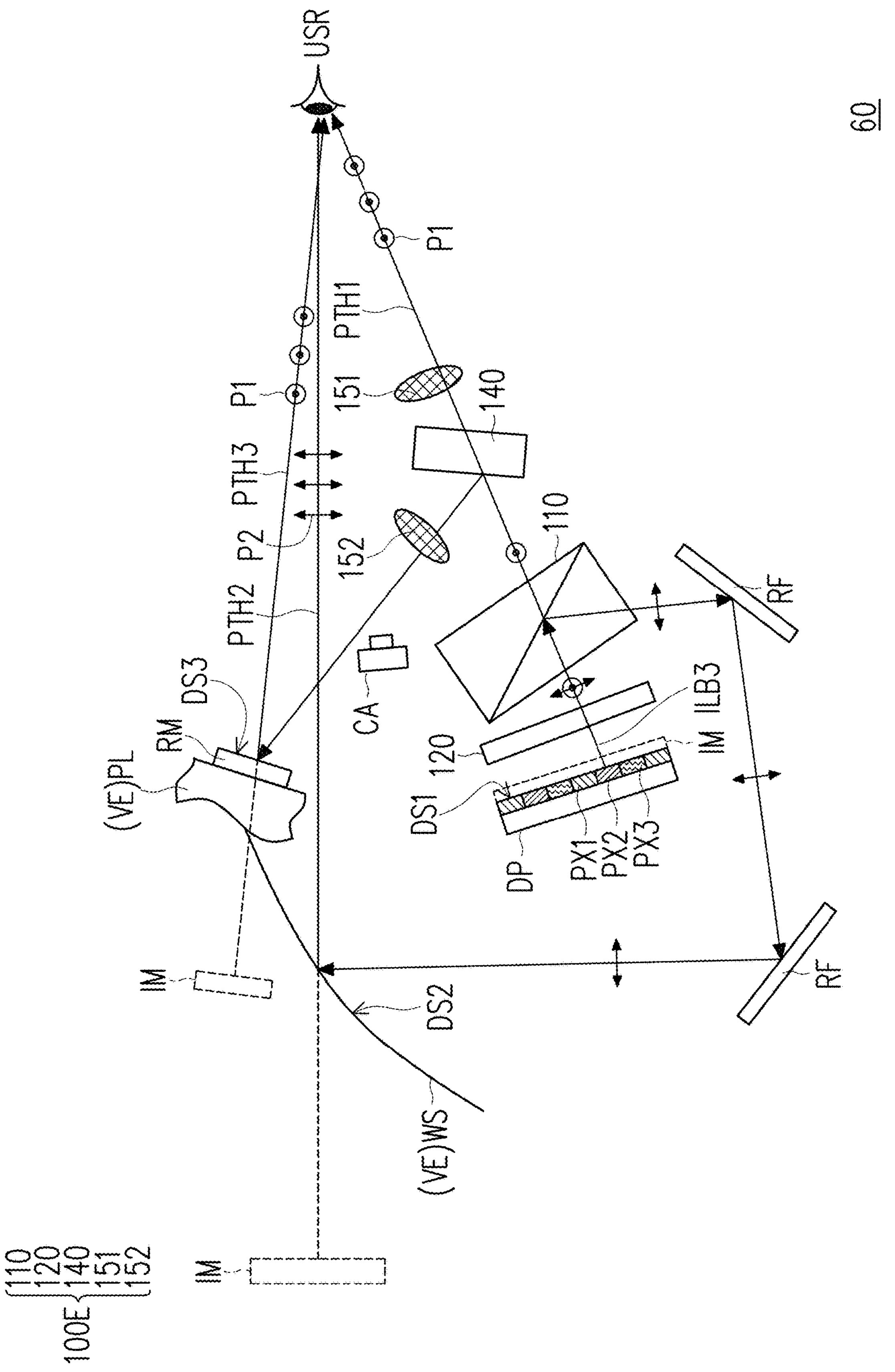

Referring to FIG. 6D, when the display apparatus 60 is set in the hybrid mode, the second pixel PX2 of the display panel DP is enabled to emit the image beam ILB3 of the green color (i.e. the third color). When the image beam ILB3 has both the polarization component of the first polarization state P1 and the polarization component of the second polarization state P2 (i.e. the third polarization state) after passing through the electrically controlled polarization modulator 120, a part of the image beam ILB3 having the first polarization may penetrate the polarizing beam splitting element 110, and another part of the image beam ILB3 having the second polarization state P2 may be reflected by the polarizing beam splitting element 110 and transmitted along the second optical path PTH2.

In particular, a part of the image beam ILB3 having the first polarization state P1 after penetrating the electrically controlled polarization modulator 120 may penetrate the first filter element 151 and be transmitted along the first optical path PTH1. Another part of the image beam ILB3 with the first polarization state P1 reflected by the beam splitting element 140 may penetrate the second filter element 152 and be transmitted along the third optical path PTH3. At this time, the display panel DP may simultaneously present the image IM (such as the mixed message of the in-vehicle information and the warning signal) on the first display surface DS1, the second display surface DS2, and the third display surface DS3 for viewing by the user USR.

Through the polarization state switching of the electrically controlled polarization modulator 120 and the effects of blocking and transmission of the filter element on the lights of different colors, the image beam from the display panel DP may be transmitted in three optical paths through the optical path selection module 100E, and the image of the display panel DP is presented on the desired display surfaces according to the movement of the user USR. In this way, disposing too many display panels for displaying different image information and resulting in the decrease in the actual utilization rate of these display panels and the increase in the energy consumption may be prevented. In other words, the display apparatus 60 of this embodiment utilizes the single display panel DP to switch or display simultaneously between multiple display surfaces, which may not only meet various display requirements, but also effectively reduce the energy consumption in operation.

To sum up, in the display apparatus according to an embodiment of the disclosure, the optical path selection module is adapted to switch the image beam from the display panel between different optical paths, and present the image of the display panel on different display surfaces according to different usage requirements. In this way, multiple display surfaces may share the same display panel for display, which helps to greatly reduce the energy consumption in operation of the display apparatus.

What is claimed is:

1. A display apparatus, adapted to display on at least one of a first display surface and a second display surface, the display apparatus comprising:

a display panel, provided with the first display surface, and adapted to emit an image beam;

an optical path selection module, disposed on a transmission path of the image beam from the display panel, and comprising:

a beam splitting element, adapted to allow a part of the image beam to penetrate and reflect another part of the image beam;

a first filter element, disposed on the transmission path of the part of the image beam penetrating the beam splitting element; and a second filter element, disposed on the transmission path of the another part of the image beam reflected by the beam splitting element, wherein the image beam transmitted along a first optical path after passing through the optical path selection module is adapted to present a first image on the first display surface, the image beam transmitted along a second optical path after passing through the optical path selection module is adapted to present a second image on the second display surface, and the first image is different from the second image; and at least one reflective element, disposed on the second optical path, wherein in response to the image beam having a first color, the part of the image beam is adapted to penetrate the first filter element and be transmitted along the first optical path, and the another part of the image beam is adapted to be blocked by the second filter element and is not transmitted along the second optical path, and in response to the image beam having a second color, the part of the image beam is adapted to be blocked by the first filter element and is not transmitted along the first optical path, and the another part of the image beam is adapted to penetrate the second filter element and be transmitted along the second optical path, and the first color is different from the second color.

2. The display apparatus according to claim 1, adapted to be installed in a vehicle, wherein the vehicle has a windshield, and the second display surface is disposed on the windshield.

3. The display apparatus according to claim 1, further comprising:

an eye-tracking module, adapted to trigger the optical path selection module to switch between the first optical path and the second optical path according to a gaze direction of a user.

4. The display apparatus according to claim 1, wherein in response to the image beam having a third color, the part of the image beam is adapted to penetrate the first filter element and be transmitted along the first optical path, the another part of the image beam is adapted to penetrate the second filter element and be transmitted along the second optical path, and the third color is different from the first color and the second color.

5. The display apparatus according to claim 1, wherein the optical path selection module further comprises:

a polarizing beam splitting element; and an electrically controlled polarization modulator, disposed between the polarizing beam splitting element and the display panel and adapted to switch a polarization state of the image beam from the display panel between a first polarization state and a second polarization state, wherein in response to the image beam having the first polarization state, the image beam is adapted to penetrate the polarizing beam splitting element, and in response to the image beam having the second polarization state, the image beam is adapted to be reflected by the polarizing beam splitting element and transmitted along the second optical path, wherein the beam splitting element is disposed on the transmission path of the image beam penetrating the polarizing beam splitting element.

6. The display apparatus according to claim 5, wherein in response to the image beam penetrating the polarizing beam splitting element having the first color, the part of the image beam is adapted to penetrate the first filter element and be transmitted along the first optical path, and the another part of the image beam is adapted to be blocked by the second filter element and is not transmitted along a third optical path, and in response to the image beam penetrating the polarizing beam splitting element having the second color, the part of the image beam is adapted to be blocked by the first filter element and is not transmitted along the first optical path, the another part of the image beam is adapted to penetrate the second filter element and be transmitted along the third optical path, the first color is different from the second color, the image beam penetrating the second filter element and transmitted along the third optical path is adapted to display a third image on a third display surface, and the third image is different from the first image and the second image.

7. The display apparatus according to claim 6, wherein in response to the image beam penetrating the polarizing beam splitting element having a third color, the part of the image beam is adapted to penetrate the first filter element and be transmitted along the first optical path, the another part of the image beam is adapted to penetrate the second filter element and be transmitted along the third optical path, and the third color is different from the first color and the second color.

* * * * *